(12) United States Patent
Parker et al.

(10) Patent No.: US 7,925,982 B2
(45) Date of Patent: Apr. 12, 2011

(54) SYSTEM AND METHOD OF OVERLAYING AND INTEGRATING DATA WITH GEOGRAPHIC MAPPING APPLICATIONS

(76) Inventors: Cheryl Parker, San Francisco, CA (US); Yosri Diab, North Vancouver (CA)

( * ) Notice: Subject to any disclaimer, the term of this patent is extended or adjusted under 35 U.S.C. 154(b) by 241 days.

(21) Appl. No.: 11/847,039

(22) Filed: Aug. 29, 2007

(65) Prior Publication Data

US 2008/0059889 A1  Mar. 6, 2008

Related U.S. Application Data

(60) Provisional application No. 60/841,540, filed on Sep. 1, 2006.

(51) Int. Cl.
*G06F 3/048* (2006.01)

(52) U.S. Cl. ...... 715/748; 707/763; 370/310; 455/456.1

(58) Field of Classification Search ........................ None
See application file for complete search history.

(56) References Cited

U.S. PATENT DOCUMENTS

| | | | |
|---|---|---|---|
| 5,930,474 | A | 7/1999 | Dunworth et al. |
| 6,092,076 | A | 7/2000 | McDonough et al. |
| 6,608,892 | B2 * | 8/2003 | Shaffer et al. ............ 379/207.12 |
| 6,642,925 | B2 | 11/2003 | Roy et al. |
| 7,076,505 | B2 | 7/2006 | Campbell |
| 7,158,878 | B2 | 1/2007 | Rasmussen et al. |
| 7,386,318 | B2 * | 6/2008 | Moon et al. ................. 455/456.3 |
| 7,516,156 | B2 * | 4/2009 | Klein ............................ 707/102 |
| 2001/0035880 | A1 | 11/2001 | Musatov et al. |
| 2003/0139983 | A1 * | 7/2003 | Spencer et al. .................. 705/28 |
| 2003/0182052 | A1 * | 9/2003 | DeLorme et al. ............. 701/201 |
| 2003/0210825 | A1 | 11/2003 | Friederich et al. |
| 2005/0114354 | A1 | 5/2005 | Singh et al. |
| 2005/0209781 | A1 * | 9/2005 | Anderson ......................... 702/5 |
| 2005/0270311 | A1 | 12/2005 | Rasmussen et al. |
| 2006/0161586 | A1 | 7/2006 | Tierney |
| 2006/0200384 | A1 | 9/2006 | Arutunian et al. |
| 2006/0271281 | A1 | 11/2006 | Ahn et al. |
| 2006/0285152 | A1 | 12/2006 | Skillen |
| 2007/0050340 | A1 * | 3/2007 | von Kaenel et al. .............. 707/3 |
| 2007/0067106 | A1 | 3/2007 | Antoine |

(Continued)

OTHER PUBLICATIONS

Future Vision Web Solutions, "Real Estate Maps," USflashmaps.com, 2004-2006.

(Continued)

*Primary Examiner* — Don Wong
*Assistant Examiner* — Shyue Jiunn Hwa
(74) *Attorney, Agent, or Firm* — Edell, Shapiro & Finnan, LLC

(57) ABSTRACT

The present invention embodiments include a geographic overlay system including an information system, a mapping system interface to communicate with a mapping system and a database system including National Census geographic boundaries and data files. The geographic overlay system utilizes a client/server model that streams geographic data from a server system to dynamically render vector-based map layers inside a client browser. The geographic overlay system employs a Nationwide database of Census geographies that may be rendered as interactive point, line or polygon objects over a National base map provided by the mapping system. A database builder interface enables users to build the database and server pages. The present invention embodiments overlay translucent, interactive dynamically generated vector-based polygonal Census boundary map layers over geographical maps from the mapping system. The overlaying vector map layers perform thematic analysis, enable information retrieval, display mouse-over tool-tips and query a dynamic block-level National spatial-relational database.

20 Claims, 21 Drawing Sheets

U.S. PATENT DOCUMENTS

2007/0083329 A1  4/2007  Im

OTHER PUBLICATIONS

Map Bureau, "What is pointMapper," www.mapbureau.com, 2004, 2005.

Maponics, LLC, "Maponics TrueVector Flash Mapping Technology," www.maponics.com.

Urban Explorer and Geographs Corp. "CensusTrax; An On-line Web GIS Service that can be Customized:," www.censustrax.com, Jun. 26, 2007.

WorldKit Easy Web Mapping, "Flash Component," www.worldkit.org, 2007.

CensusTrax, "CensusTrax beta," http://localhost/censustrax/Archive/censustrax_small.htm, Apr. 8, 2006.

CensusTrax, "About geoflash Explorer," http://localhost/CensusTrax/Archive/geoflash_info_small.htm, Apr. 8, 2006.

Cengea A Trimble Company; 2010 Cengea Colutions Inc. http://cengea.com/technology/overview.htm.

Vue Technology; Item Level RFID—Vue Technology; 2010 Vue Technology, Inc.; http://www.vuetechnology.com.

Property Information and Maps; Boundary Solutions Inc.; National ParcelMapData Portal, NPDP, BSI, NPDP Plus copyright 2009 BSI; ParcelAtlas copyright 2009; http://www.parcelatlast.com/default.htm.

* cited by examiner

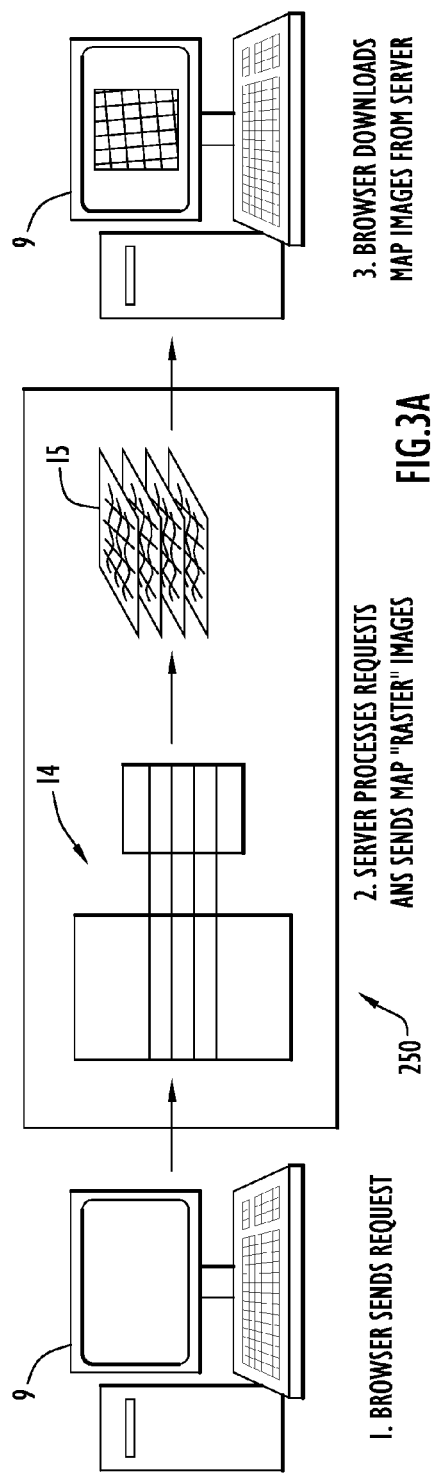
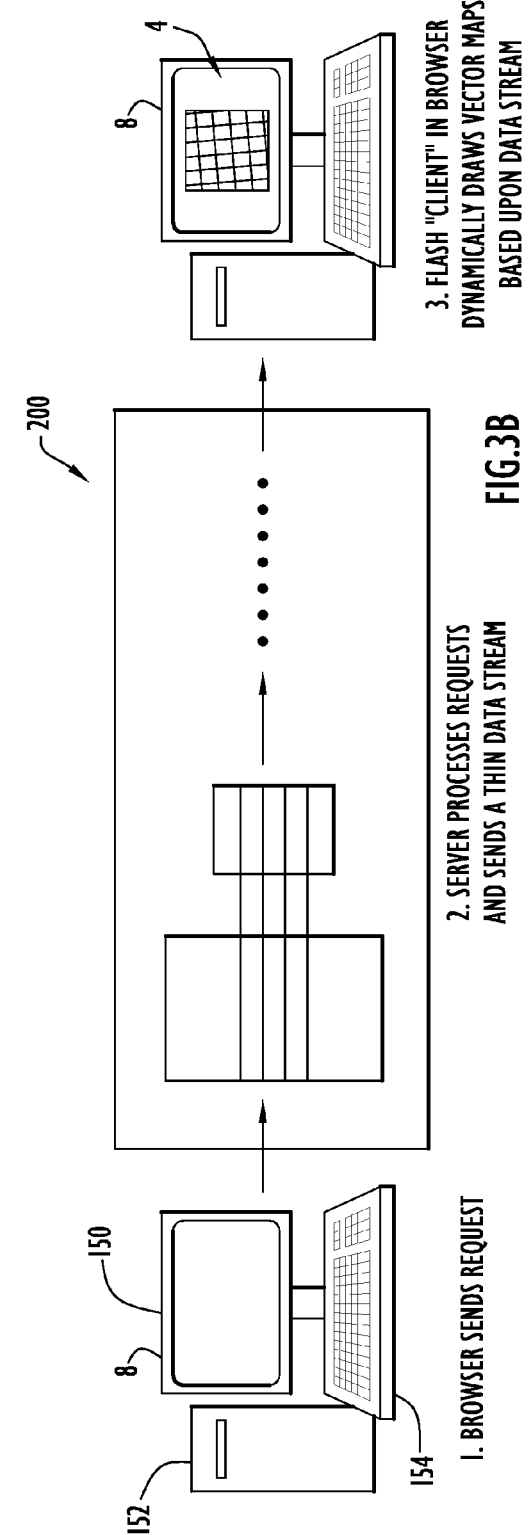
FIG.3A PRIOR ART
FIG.3B

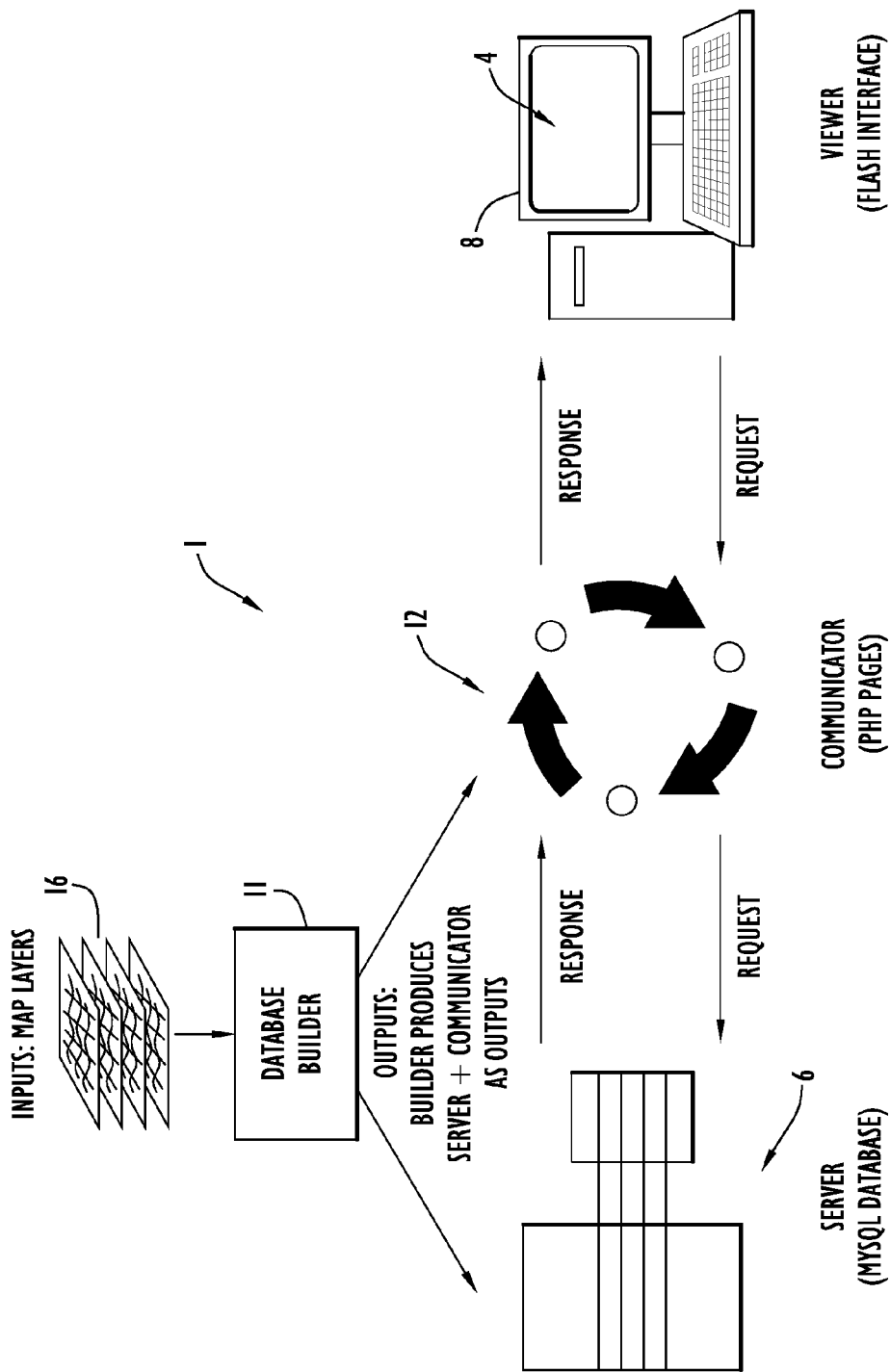

SYSTEM AND METHOD OF OVERLAYING AND INTEGRATING DATA WITH GEOGRAPHIC MAPPING APPLICATIONS

CROSS-REFERENCE TO RELATED APPLICATIONS

This application claims priority from U.S. Provisional Patent Application Ser. No. 60/841,540, entitled "Internet Census Geographic Information System (GIS) and Method of Applying Census Data to Geographic Mapping Applications" and filed Sep. 1, 2006, the disclosure of which is incorporated herein by reference in its entirety.

BACKGROUND OF THE INVENTION

1. Technical Field

The present invention embodiments pertain to Geographic Information Systems (GIS). In particular, the present invention embodiments pertain to a geographic overlay system that provides a detailed geographical and data profile of a local setting.

2. Discussion of the Related Art

Internet (or web) Geographic Information Systems (GIS) typically comprise a GIS database that resides on a server, a user interface on the client-side and some type of active server page that processes requests between a browser and the server. In addition, some of these systems have an administration interface to assist a System Administrator in automatically generating the web protocols for displaying the GIS database in a client browser. There are a variety of approaches for implementing web GIS. For example, a server-based Internet Map Server (IMS) web GIS system dynamically produces opaque tiled raster images on the server-side that must be uploaded to the user browser (e.g., tiles are portions of an image that are arranged or assembled to form the overall image). These raster-based images may employ various file formats (e.g., JPEG, GIF, PNG or MWF formats). A main problem with these types of systems includes requiring a delay in request processing time in order to upload the images.

Adobe Flash-based mapping systems (which may or may not have a Flash-based interface and are not connected to a database) upload static SWF files stored on a server, either on a per-request basis or upon launch of a web site. Problems related to these types of Flash mapping systems include the limited breadth of the geographic area covered and the delay in processing time required for uploading the SWF files to the client browser.

Flash mapping type systems are connected to a server that dynamically generates SWF files on the server-side as needed based on user input. These SWF files are uploaded to a user browser and arranged as tiles. A main problem with these types of systems includes requiring a delay in request processing time in order upload the SWF files.

AJAX-based (Asynchronous JavaScript and XML) client-side API web mapping systems use a combination of server-based tiling of raster images with client-side JavaScript to dynamically render vector-based points within the client browser. A main problem of these types of systems includes the limited amount of client-side rendering performed due to client-side memory restrictions and data transfer limitations. Accordingly, these types of systems cannot dynamically render interactive polygons (e.g., defining or representing a geographic area on the map). Rather, the systems are limited to rendering points (e.g., representing specific locations or points of interest on a map) and lines (e.g., representing streets on a map), simple datasets and functions.

SVG (Scalable Vector Graphics) vector-based web GIS systems suffer from the disadvantage of requiring a non-standard "plug-in" download in order to use the system.

SUMMARY OF THE INVENTION

Accordingly, the present invention embodiments are directed toward a geographic overlay system that includes a geographic-based information system, a mapping system interface to communicate with a mapping system and a database system including National Census geographic boundaries and data files. The geographic overlay system utilizes a client/server model that streams geographic data from a server system to dynamically render vector-based map layers directly inside a user or client browser. The geographic overlay system further employs a Nationwide database of Census geographies that may be rendered as interactive polygon objects over a National base map provided by the mapping system. A database builder interface enables users to build the database and server pages. The present invention embodiments seamlessly overlay translucent, interactive dynamically generated vector-based polygonal Census boundary map layers over geographical maps from the mapping system. The overlaying vector map layers perform thematic analysis, enable information retrieval, display mouse-over tool-tips and query a dynamic block-level National spatial-relational database.

An embodiment of the present invention includes an interactive multi-National web-based geographic overlay system that provides a detailed geographical and data profile of a local setting. The geographic overlay system retrieves, maps and exports datasets that are aggregated based upon the boundaries of National Census geographies. The geographic overlay system further communicates with a variety of geographic-based web services to dynamically map listings of current events and amenities in a local area, and may be customized to suit unique needs for a variety of applications.

The present invention embodiments provide several advantages including a quick request/response loop for map data retrieval, comprehensive geographic breadth and detail, high resolution vector-based imagery, utilization without a non-standard plug-in, and rendering interactive client-side polygons.

BRIEF DESCRIPTION OF THE DRAWINGS

FIG. 3A is a flow diagram illustrating a conventional manner of processing a geographic mapping request.

FIG. 3B is a flow diagram illustrating the manner which a geographic mapping request is processed by the geographic overlay system in accordance with an embodiment of the present invention.

FIG. 4 is a diagrammatic illustration of the information system of the geographic overlay system according to an embodiment of the present invention.

DETAILED DESCRIPTION OF THE PREFERRED EMBODIMENTS

Figure 1:
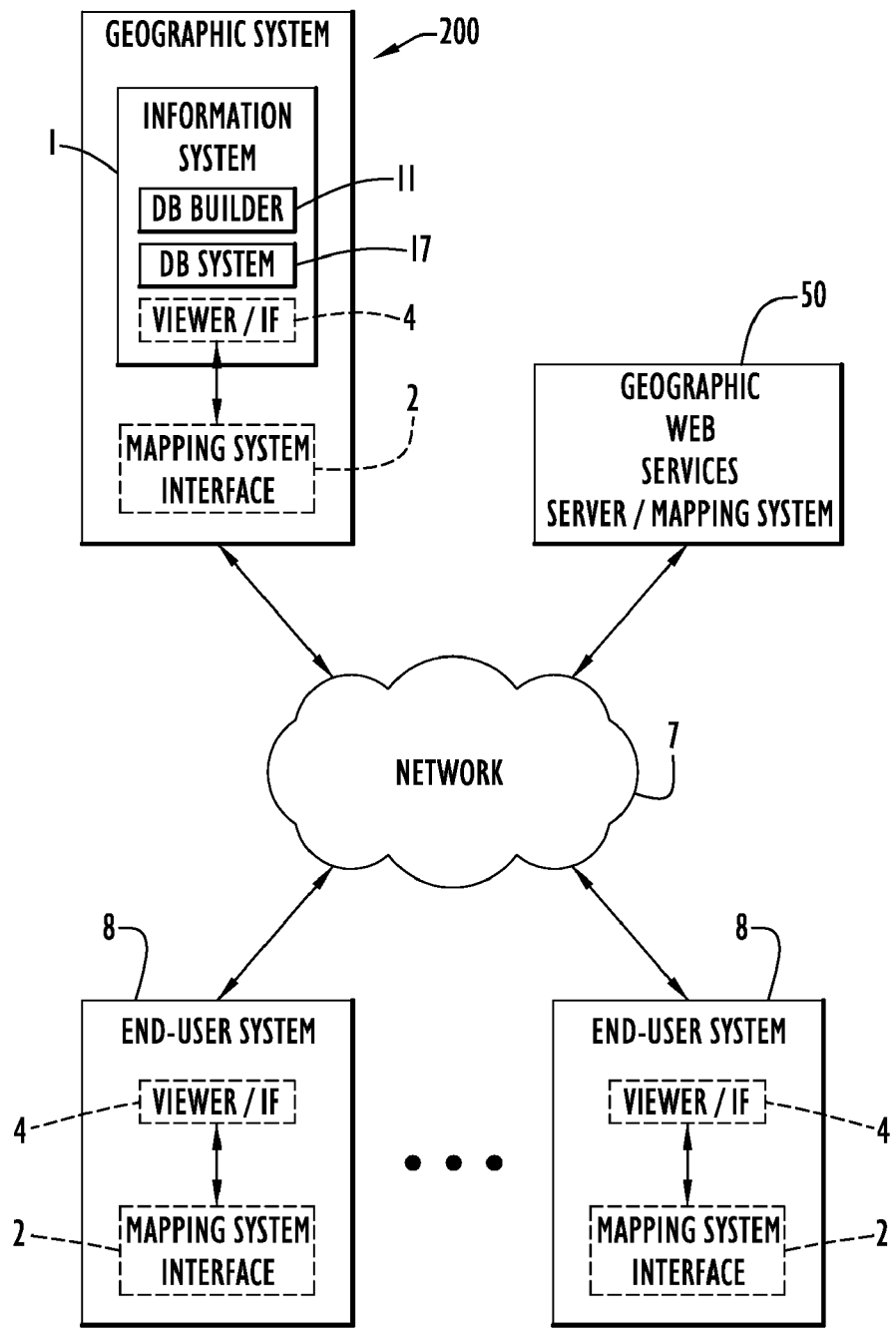
FIG. 1 is a diagrammatic illustration of a network topology employing a geographic overlay system according to an embodiment of the present invention.

The present invention embodiments pertain to a geographic overlay system that overlays map layers onto a geographic mapping application to provide information pertaining to various locations on an underlying map. The geographic overlay system preferably utilizes geographic boundaries from National Census data to define geographic map areas and enable retrieval of corresponding information for those areas. The geographic overlay system renders points (e.g., specific locations or points of interest), lines (e.g., streets) and polygons (e.g., geographic areas, such as neighborhoods, towns, counties, etc.) within overlaying map layers to indicate corresponding locations on the underlying geographic map, and provides information associated with those locations. Thus, the geographic overlay system may enable users to draw on a map, save the boundaries, and perform a multi-layered spatial analysis that incorporates the newly drawn or generated map layer.

The geographic overlay system includes a geographic-based information system, a mapping system interface to communicate with a mapping system (e.g., similar to Google Maps or ESRI Arcweb Services), and a spatial-relational database system, preferably including National Census geographic boundaries and data files. The information system dynamically renders vector-based map layers (e.g., geometrical formulas are used to represent images) over an underlying map from the mapping system on the client-side using a viewer (e.g., implemented by SWF files and Adobe Flash Player available from Adobe Corp. that is for use with visualization in web browsers). The map layers are rendered based upon a data stream including geographic coordinate and attribute information and provided from a database system (e.g., MySQL spatial-relational database server that is an open source database from MySQL Inc. and that can provide a fast, multithreaded, multi-user, and robust SQL (Structured Query Language), where a spatial component has been added within version v4.x (e.g., conforms to the Open GIS Consortium (OGC) standards) to enable implementation of a relational database with latitudinal and longitudinal coordinates) via active server pages (e.g., PHP that is a server-side scripting language for creating dynamic web pages, where the pages are created with PHP and HTML, and when a visitor opens the page, a server processes the PHP commands and sends the results to the visitor browser (since PHP is Open Source and cross-platform results are returned quickly without any process creation)). The geographic overlay system provides several advantages including optimizing result/response time, user interactivity and enhanced quality of map resolution.

The information system preferably utilizes an Adobe Flash-based client-side interface with server-side Open Source spatial-relational databases. The server-based spatial-relational databases provide speed and scalability in providing data to a user browser. The ability to dynamically render vector-based (e.g., geometrical formulas are used to represent images), spatially accurate map layers (above an underlying map) spontaneously and directly within the client browser based upon textual information with geographic coordinates retrieved from a spatial-relational database enables the geographic overlay system to be fast and very robust, and to produce high resolution maps. These capabilities are present since no raster-based tiled images (e.g., tiles are portions of an image or map that are arranged or assembled to form the overall image) or SWF files need to be uploaded to the user browser (e.g., as performed in conventional web GIS systems). Rather, only a data stream with geographic coordinate (and attribute) information is passed to the user browser from the database system via active server pages, where the viewer dynamically renders polygon, line and point objects on the client-side directly within the user browser to produce a series of spatially accurate map layers as described below. This technique optimizes the speed of the request/response loop and, therefore, the speed of the geographic overlay system. Further, since only a data stream is passed between the database system and browser, the geographic overlay system drastically differs from conventional server-side web GIS systems, where a server dynamically generates raster-based imagery (e.g., JPEG, GIF, PNG, MWF formats) or vector-based files (e.g., SWF or SVG formats) and passes these files to the browser. The transferred files are assembled as tiles within the browser.

The information system Graphical User Interface (GUI) or viewer is preferably Flash-based, thereby enabling the geographic overlay system to be highly interactive. This highly interactive nature, combined with a very fast request/response loop and high resolution maps brings web GIS into the realm of desktop mapping software. The database builder of the information system automatically creates the relational database (e.g., MySQL) and required code (e.g., PHP) based upon user-defined parameters that may be saved in a template.

The client-side dynamic vector-based mapping property enables the information system to be integrated with a mapping system (e.g., an API Mapping System). In other words, due to the translucent character of the vector-based map layers, a map from the mapping system may be viewed underneath the map layers. Since the map layers are served by an OGC-compliant spatial-relational database, and thus dynamically drawn within the viewer based upon these parameters, the map layers align seamlessly with the underlying map.

The combination of the mapping system, information system (e.g., a client/server-based dynamically generated Flash-based web GIS) and a National spatial-relational database results in a comprehensive multi-National web GIS system. The server-side mapping system provides seamless, accurate multi-National coverage with panning and zooming and accurate multi-National address location and/or geocoding (e.g., assigning geographic coordinates based on location information). The information system is coupled to a spatial-relational database, performs dynamic spatial analysis, and displays highly interactive polygonal-based datasets that may be displayed thematically. An underlying spatial-relational database composed of National Census geographies (e.g., from the smallest geographic unit to the largest geographic unit) creates a National block-level web GIS framework. This enables users to perform dynamic thematic/spatial analysis of any dataset for any location in a Nation down to the smallest aggregate level. Further, the information system enables System Administrators to add any local or National data set directly into the relational database, thereby providing detailed local GIS data systems within the context of a multi-National system. In addition, the combination of the information and mapping systems optimizes speed since plural servers simultaneously process a single request.

A present invention embodiment may provide the following functionality: dynamic tool tips and labeling; zoom to an address; local search for businesses and events; web/blog search for any selected item; select-and-zoom drop-down lists; dynamic multi-criteria queries; map navigation, including panning and zooming; click-on-map to retrieve data for the selected geographic area; draw on the map to define an area; dynamic two dimensional (2-D) and three dimensional (3-D) thematic mapping of polygon, point and line data; users viewing the thematic distribution of a selected polygonal dataset across the map, either via a color range distributed across a two dimensional (2-D) map or by a three dimensional (3-D) display, with heights varying per data range; dynamic tables that display information about the selected geographic area or item; report templates that may be printed; trend graphs that display selected data results across time; animated thematic maps that display selected data results across time; pie or bar charts that display data distribution across each variable; tabular data that can be exported as a comma delimited file; map data that can be exported as XML to be dynamically integrated into other web GIS services; and the ability to connect to other XML, GML or PHP-based web services.

A network topology including a geographic overlay system according to an embodiment of the present invention is illustrated in FIG. 1. Specifically, the topology preferably includes geographic overlay system 200 and a geographic web services or mapping system 50 each in communication with or connected to a network 7 (e.g., the Internet), and end-user computer systems 8 accessing the geographic overlay system and mapping system via the network to receive geographic mapping services as described below. Geographic overlay system 200 is in the form of a server computer system and includes an information system 1 and a mapping system interface 2. The mapping system interface provides and controls manipulation of a base geographic map (e.g., zooming, panning, etc.) in accordance with user actions as described below. The information system retrieves information pertaining to locations on the underlying base map and facilitates rendering of map layers with the retrieved information to be overlaid with the base map. The information system includes mapping system interface 2 to communicate with mapping system 50, a viewer or user interface 4 to render the overlaying map layers on the end-user systems, a database builder 11 and a database system 17. Database system 17 stores spatial and attribute information for rendering the map layers, while database builder 11 generates information to populate the database system. The information system and mapping system interface communicate with each other as described below, where the viewer and mapping system interface are preferably client-side applications and function on the end-user systems.

The end-user computer systems are typically implemented by conventional personal or other suitable computer systems preferably equipped with a display or monitor 150 (FIG. 3B), a base 152 (e.g., including the processor, memories and internal or external communications devices (e.g., modem, network cards, etc.)), a keyboard 154 and optional mouse or other input device. End-user systems 8 each include software (e.g., operating system, Internet browser, client-side applications of the geographic overlay system, etc.) to communicate with geographic overlay system 200, and appropriate components (e.g., processor, disk storage or hard drive, etc.) having sufficient processing and storage capabilities to effectively execute the software. The end-user systems may utilize any of the major platforms (e.g., Linux, Macintosh, Unix, OS2, Windows, etc.).

Similarly, geographic overlay system 200 and mapping system 50 are typically implemented by conventional personal or other suitable computer systems preferably equipped with a display or monitor, a base (e.g., including the processor, memories and internal or external communication devices (e.g., modem, network cards, etc.)), a keyboard and optional mouse or other input device. The geographic overlay system and mapping system include software (e.g., operating system, server software, software for the information system, mapping software, etc.) to communicate with end-user systems 8 and process requests, and appropriate components (e.g., processor, disk storage or hard drive, etc.) having sufficient processing and storage capabilities to effectively execute the software. The geographic overlay system and mapping system may utilize any of the commercially available operating systems and/or server software. One or more of the various computer systems of the present invention embodiments (e.g., geographic overlay system, mapping system, end-user systems, etc.), under software control, preferably implement the geographic overlay system of the present invention embodiments for processing requests from the end-user computer systems and providing geographic and/or mapping services and corresponding information for user-selected map locations.

Figure 2:
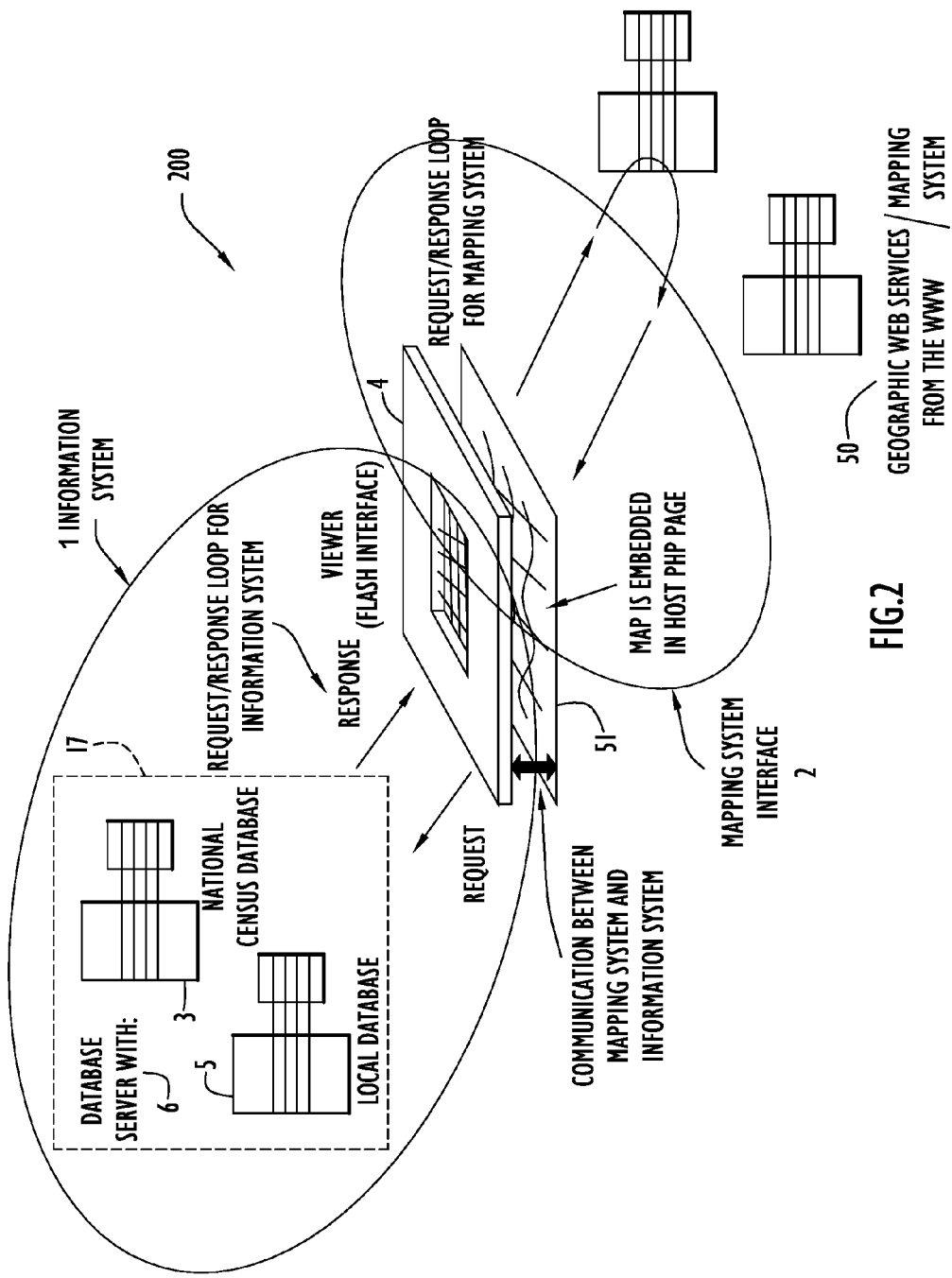
FIG. 2 is a diagrammatic illustration of the geographic overlay system of FIG. 1 according to an embodiment of the present invention.

Referring to FIG. 2, geographic overlay system 200 includes geographic-based information system 1 and mapping system interface 2 as described above. The information system is coupled to or includes database system 17. The database system includes a National spatial-relational database server 6 with a National Census database 3 storing national Census geographies, and local spatial-relational databases 5 storing information pertaining to local areas or jurisdictions based on geographic locations or coordinates. Databases 3, 5 each include tables with geographic coordinate information (e.g., a coordinate table) and attribute information (e.g., an attribute table). The coordinate tables for Census and local databases 3, 5 are generated using database builder 11 (FIG. 4) as described below. The coordinate tables (e.g., generated by the database builder) may include attribute information. The attribute tables only include attribute information pertaining to each geographic area. These attribute tables are not generated by the database builder, but are added to the database by a System or Database Administrator. The coordinate table includes a primary key that is an arbitrary unique identifier (e.g., a number, etc.). This table further includes a field that provides the official identification (ID) (e.g., serving as a linking field to another table) for each geographic area (e.g., Census tract, zip code, neighborhood name, etc). The attribute table is keyed to the coordinate table based on the linking field (e.g., official identification), where this linking field is the primary key for the attribute table.

In particular, Census-related databases 3 encompass an entire country or nation and are constructed using database builder 11 as described below. The Census databases include a plurality of tables each corresponding to a Census geography. For example, these tables may correspond to blocks, block groups, Census tracts, zip codes, places, sub-counties and counties. The Census databases include a database with the coordinate tables for each Census geographical area, and a database with the attribute tables for each Census area. This attribute information may include Census demographics or other types of attribute information for each census area (e.g., business information, real estate information, consumer expenditure information, etc).

Local databases 5 are generated by the database builder for local jurisdictions based on files (e.g., ESRI shapefiles) of local features (e.g., contour lines, flood plains, council districts, redevelopment areas, etc.) as described below. The local databases include coordinate tables and attribute tables similar to Census database 3 described above. The coordinate tables may include attribute information, while databases 5 may include attribute tables that only contain attributes (e.g., without geometry) for the specific areas and features. Databases 3, 5 may be implemented by any commercially available or other databases and are preferably Open Source.

Information system 1 is typically in the form of a server-driven web Geographic Information System (GIS) including highly interactive, client-side, dynamically rendered, vector-based map layers and client-side viewer or user interface 4 for end-user system 8 (e.g., a Flash-based interface). The spatial-relational databases provide speed and scalability, while the ability to dynamically render vector-based, spatially accurate map layers (overlaid on the underlying base map) from a spatial-relational database on the client-side directly within viewer 4 enhances system speed and provides high resolution map layers with spatially-accurate, interactive point, line and polygon objects. The highly interactive and customizable user interface brings web GIS into the realm of desktop mapping.

Spatial-Relational database server 6 is preferably fully compliant with Open GIS Consortium (OGC) standards and enables the information system to be seamlessly integrated with other web GIS systems and geospatial web services. This OGC compliance further enables a full range of spatial analytical capabilities (e.g., buffering, cross-layer spatial analysis, etc.). This spatial analytical functionality is enhanced by the user interactivity provided by viewer 4. Accordingly, the geographic overlay system enables users to draw on a map, save the boundaries, and perform a multi-layered spatial analysis that incorporates the newly drawn or generated map layer. Thus, the information system provides capabilities comparable to those of desktop GIS. By way of example, database system 17 may include an Open Source MySQL database server (e.g., MySQL 4.x is compliant with Open GIS Consortium (OGC) standards). However, the database system may include various other commercial databases (e.g., Oracle, Informix, SQL Server, MSAccess, etc.).

The information system is based on a client/server model designed to optimize speed and functionality. Information system 1 employs active server pages 51 (e.g., PHP) to retrieve textual information with geographic coordinates from spatial-relational database system 17. The retrieved information is utilized to dynamically render a vector map layer (overlaid on the underlying base map) directly within viewer 4 on a user browser (e.g., using ActionScript rendering commands). Thus, only a data stream is sent from information system 1 across the network to end-user system 8. Referring to FIGS. 3A-3B, a conventional server-based IMS web system 250 (FIG. 3A) receives a request from an end-user system 9. A system server 14 processes the request and generates raster map images 15 in response to the request. The raster map images are generally quite large and are transferred to end-user system 9 for display. Thus, this technique transfers a significant amount of information across the network.

In contrast, geographic overlay system 200 (FIG. 3B) receives a request from end-user system 8. Information system 1 processes the request and sends a data stream with information (e.g., coordinate and attribute information) enabling dynamic rendering of the resulting map layers to end-user system 8 in response to the request (e.g., the amount of information in the data stream is significantly reduced). Viewer 4 of the end-user system renders the map layers on the underlying base map within the end-user browser based on the data stream received from the information system, thereby significantly reducing the amount of information transmitted over the network. This client/server configuration enhances system speed and provides high resolution maps since the map image is vector-based (e.g., geometrical formulas are used to represent images).

An embodiment of information system 1 is illustrated in FIG. 4. Initially, the information system typically receives ESRI shapefiles 16 (or other map file formats) and Extensible Markup Language (XML) files, and may provide web services in the form of XML for incorporation into other web GIS systems. The information system may alternatively be configured for various databases (e.g., Oracle Spatial, etc.). The information system directly overlays map layers on underlying base maps from mapping system 50, and may further connect to XML, GML and PHP-based web services. Moreover, the information system may incorporate a National Census, thereby providing a National base map and a spatial-relational database as a highly robust starting framework upon which to build a custom system using a detailed local database.

Specifically, information system 1 includes mapping system interface 2, viewer 4, database builder 11, a communicator 12 and database system 17. Database builder 11 is in the form of a desktop Graphical User Interface (GUI) that receives a series of map layer specifications 16 (preferably in an ESRI shapefile format) and produces a series of SQL tables in database system 17 (e.g., MySQL Database) and active server pages 51 for communicator 12 as described below. By way of example only, the database builder is implemented in the C++ computing language, but may be implemented in any desired computing language.

Database builder 11 provides a System Administrator with a variety of options to optimize the speed of the database system and to indicate the particular map layers to display at various views (e.g., zoom levels, etc.) of the underlying base map. The database builder automatically optimizes the drawing speed for map layers by limiting the number of points based on the desired drawing scale. Further, the database builder provides the System Administrator with a Graphical User Interface (GUI) for indexing, tiling and scaling data sets to optimize speed and grow a database dataset incrementally over time. Database system 17 may accommodate large data sets (e.g., a National parcel data set). When the data set is indexed properly, the speed of a multimillion record data set is on the order of a data set with significantly fewer records (e.g., a hundred record data set). The information system may be configured across plural computer systems and database systems to accommodate the needs for redundancy and memory. The information system may further readily accommodate incremental growth of a dataset, as long as the data structure and functionality remain the same. Thus, a parcel web site that commenced as a city may incrementally transition to the size of a county, region or nation.

Figure 5:
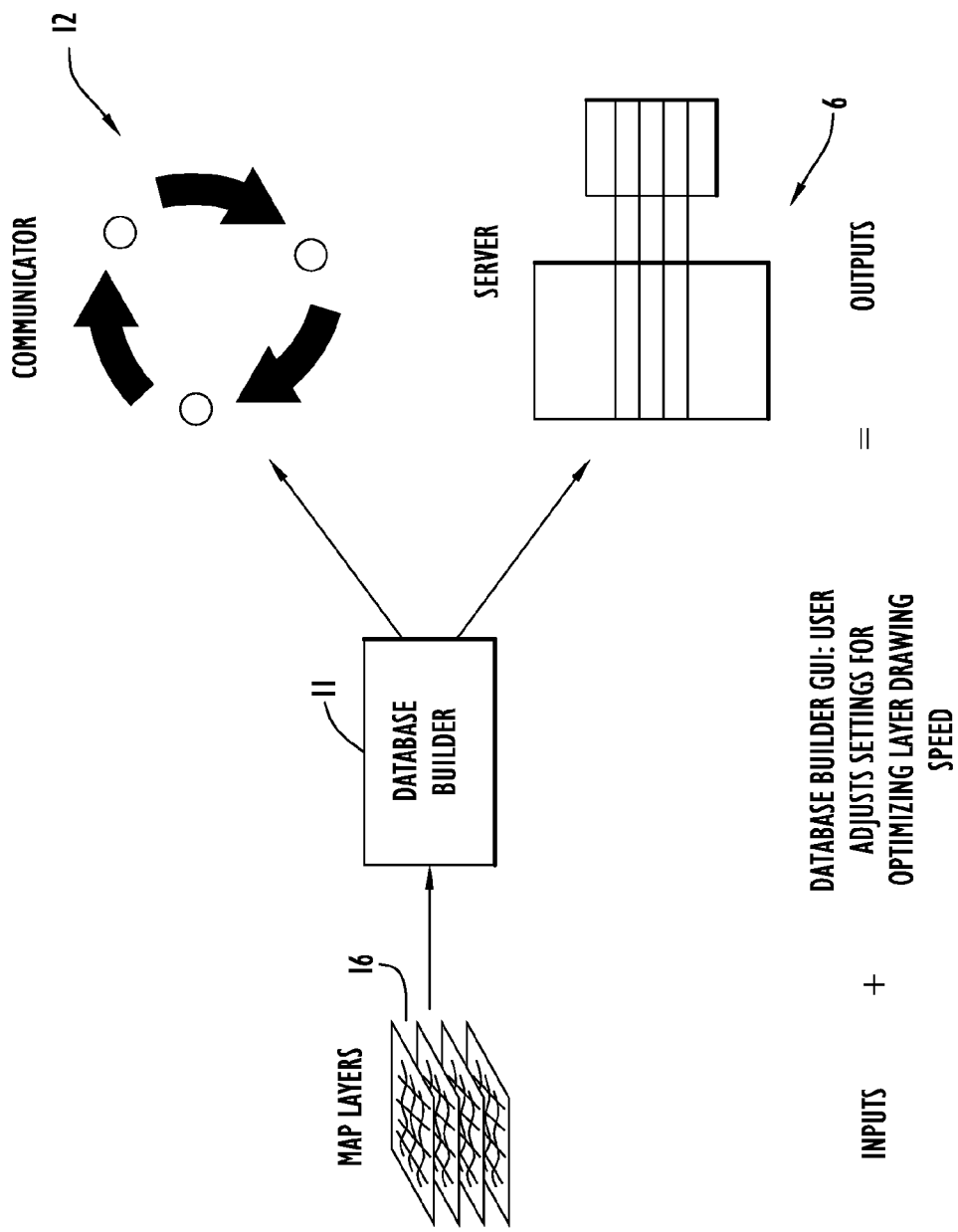
FIG. 5 is a flow diagram illustrating the manner of operation of the database builder of the geographic overlay system according to an embodiment of the present invention.

Referring to FIG. 5, database builder 11 receives a series of map layer specifications (e.g., preferably in an ESRI shapefile or other map format), address files and other tabular data sets (e.g., building permits, assessor data, etc.) 16 and produces a series of SQL tables (e.g., coordinate tables) in database system 17 (e.g., MySQL database) and active server pages 51 for communicator 12. In particular, map layer specifications 16 (e.g., shapefiles, etc.) are provided via a database builder Graphical User Interface (GUI). By way of example, the map layer specifications include the Census information (e.g., demographics, boundaries, etc.). The database builder automatically generates a series of database and active server page statements to build the components (e.g., databases 3, 5 and active server pages 51) needed for the operation of the geographic overlay system. The System Administrator may save the settings as a template, wherein subsequent updates to the database may be accomplished by opening and executing the template.

Figure 6:
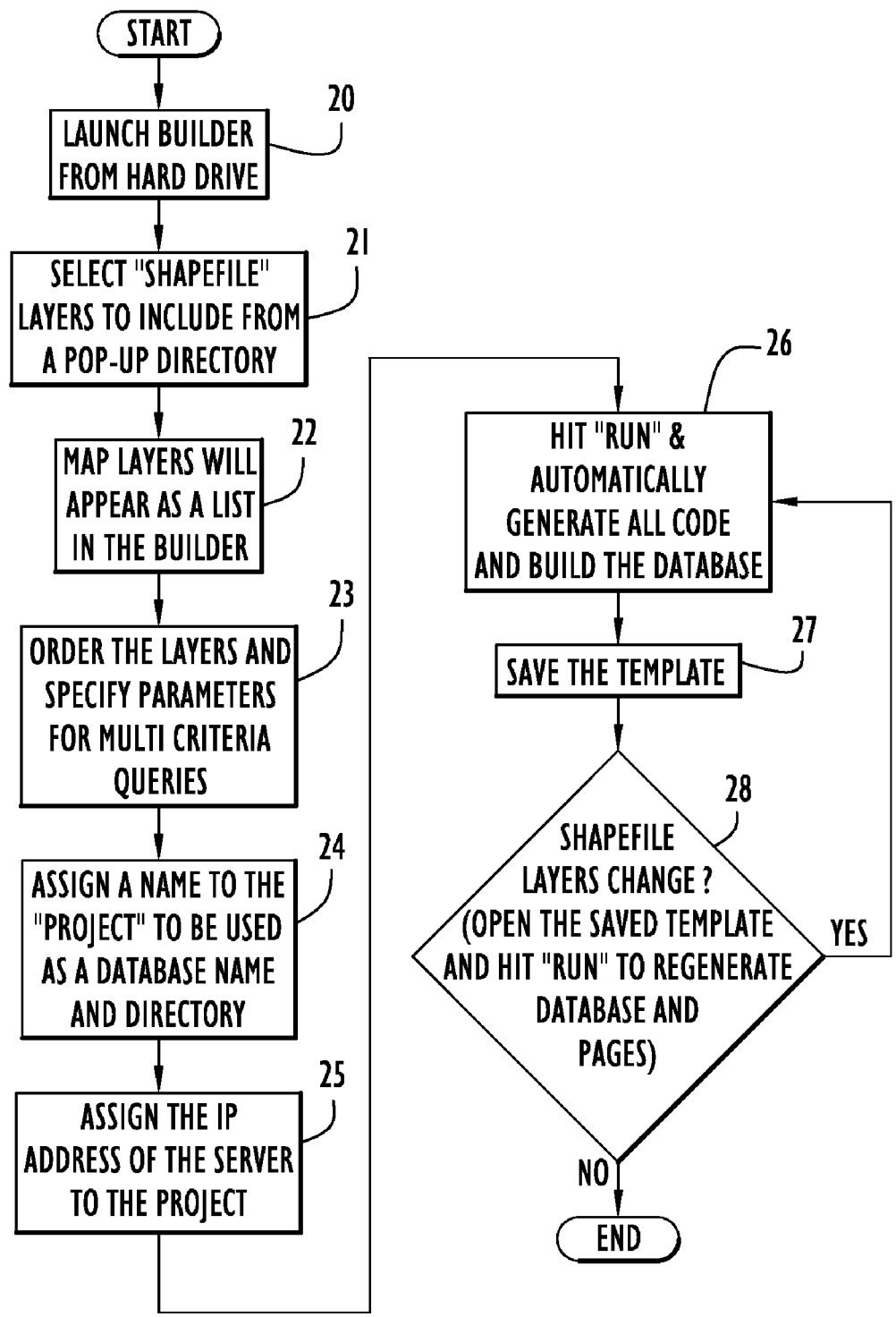
FIG. 6 is a procedural flow chart illustrating the manner in which the database builder builds the database and produces corresponding active server pages according to an embodiment of the present invention.

The manner in which the database builder produces the database and active server page statements is illustrated in FIG. 6. Initially, the database builder is invoked or launched at step 20, where map layers (e.g., from the map layer specifications) are selected via an interactive directory at step 21. The selected map layers are displayed in a list at step 22. The selected map layers may be ordered or arranged based upon the desired topmost and bottom most positions for the map layers at step 23. The user may further specify the map layers used for multi-criteria queries, and define the variables utilized for the criteria. Once the order of layers and the criteria for queries are defined, a name is assigned to the project by entering the name in an appropriate field (e.g., a "save as" text box) at step 24. The project name is further assigned to the resulting database and is utilized as the directory name for active server pages 51 generated by database builder 11. An IP address of the desired server to receive and store the databases and active server pages is entered at step 25. These parameters (e.g., database name and server address) are placed into the automatically generated active server pages.

Once the project name is assigned and the server IP address is entered, the user may initiate execution (e.g., actuate a "run" button) to automatically generate the databases (e.g., coordinate and attribute tables of databases 3, 5) and active server pages required to process end-user requests at step 26. The settings may be saved as a builder template by assigning a name to the template at step 27 (e.g., entering the name and actuating a "Save as Template" button). The template may be utilized to perform a subsequent update to the database system in response to changed shapefile or map layers at step 28 (e.g., the shapefiles with the same names are stored in the same location or directory and the saved template is retrieved and executed).

Figure 7:
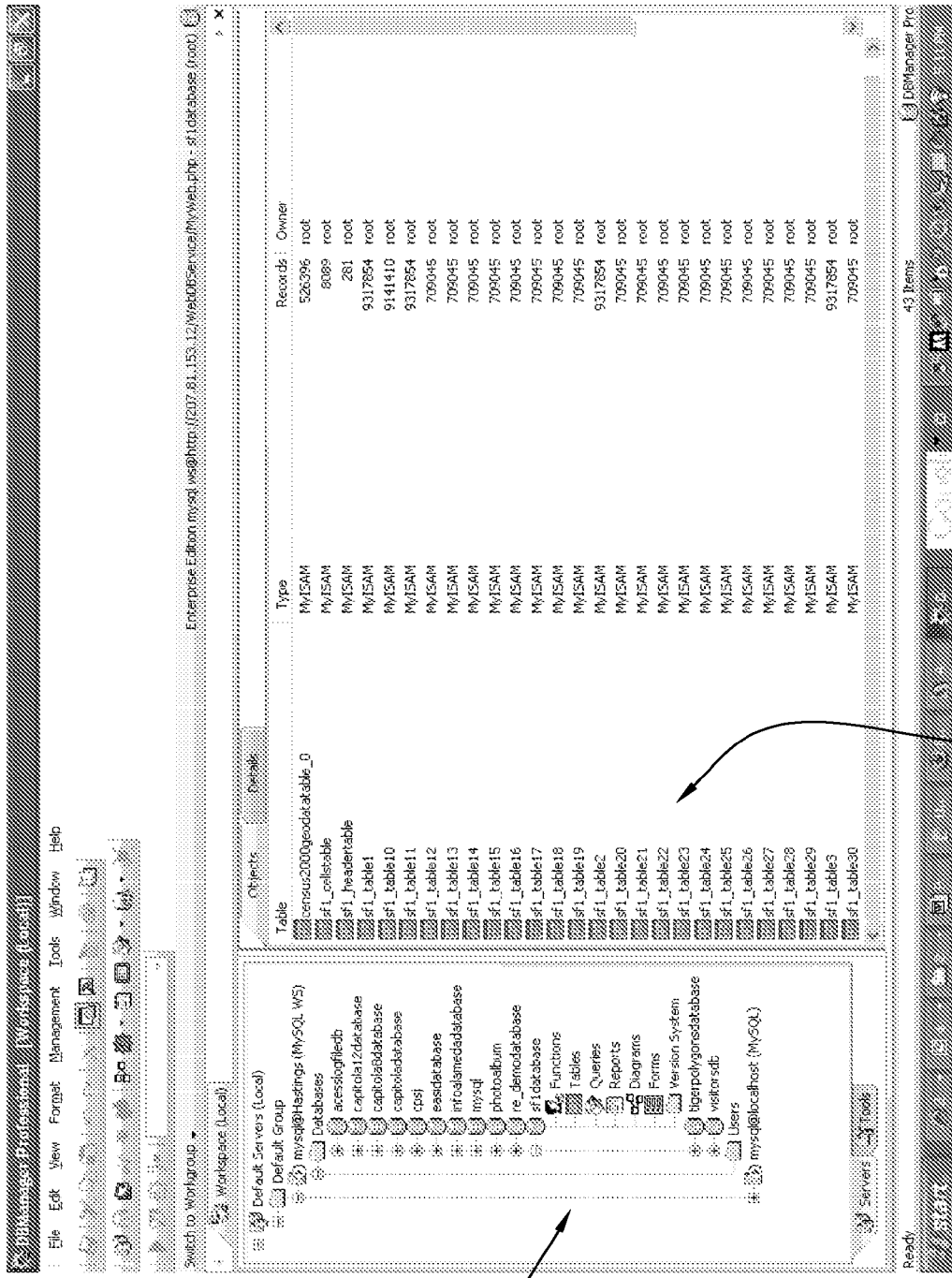
FIG. 7 is a schematic illustration of a graphical user interface of the geographic overlay system indicating information within a database system according to an embodiment of the present invention.

Databases 3, 5 of database system 17 (e.g., MySQL database) are automatically populated by database builder 11 with data translated from ESRI shapefiles (or ASCII or DBF files with spatial coordinates), address files and other tabular data sets 16 (e.g., building permits, assessor data, etc.) (FIG. 5). Referring to FIG. 7, each map layer object is associated with corresponding tables 29 (e.g., coordinate and attribute tables) in database system 17 (e.g., based on geographic coordinates or location), where data for the fields within the tables is received from the original shapefile (e.g., map layer specification) as described above. The attribute data (e.g., within the coordinate tables of databases 3 and/or 5) is typically stored in a standard MySQL format (e.g., side-by-side with the spatial coordinates (e.g., a series of longitude and latitude coordinate pairs)). Since database system 17 (e.g., MySQL) is preferably a relational database, the rules of relational databases apply. Thus, the database tables may be edited, other tables may be placed in database system 17, and tables in the database system may be queried relative to tables in other databases. This aspect enables dynamically driven multi-table/multi-variable spatial queries to be integrated into the information system interface.

By way of example, the database system may include a National spatial-relational database 3 (FIG. 2) including demographic information and geographic boundaries for all official Census areas as described above. The database structure and corresponding viewer interface may be applied to any nation with a National dataset of Census boundaries. Alternatively, database 3 may be enhanced by any number of additional databases with tabular datasets conforming to Census boundaries or any other GIS or map layer and corresponding attribute data. This enables jurisdictions or geographic areas without a comprehensive set of map layers to readily have a fairly robust local geographic overlay system (e.g., defined map layers and corresponding attribute data for that jurisdiction). In addition, the jurisdictions may build their specific geographic overlay system within a larger regional context and, therefore, be able to perform spatial analyses within a more natural data context than is typically possible due to the artificial analytical context imposed by jurisdictional boundaries and corresponding data limits.

Figure 8:
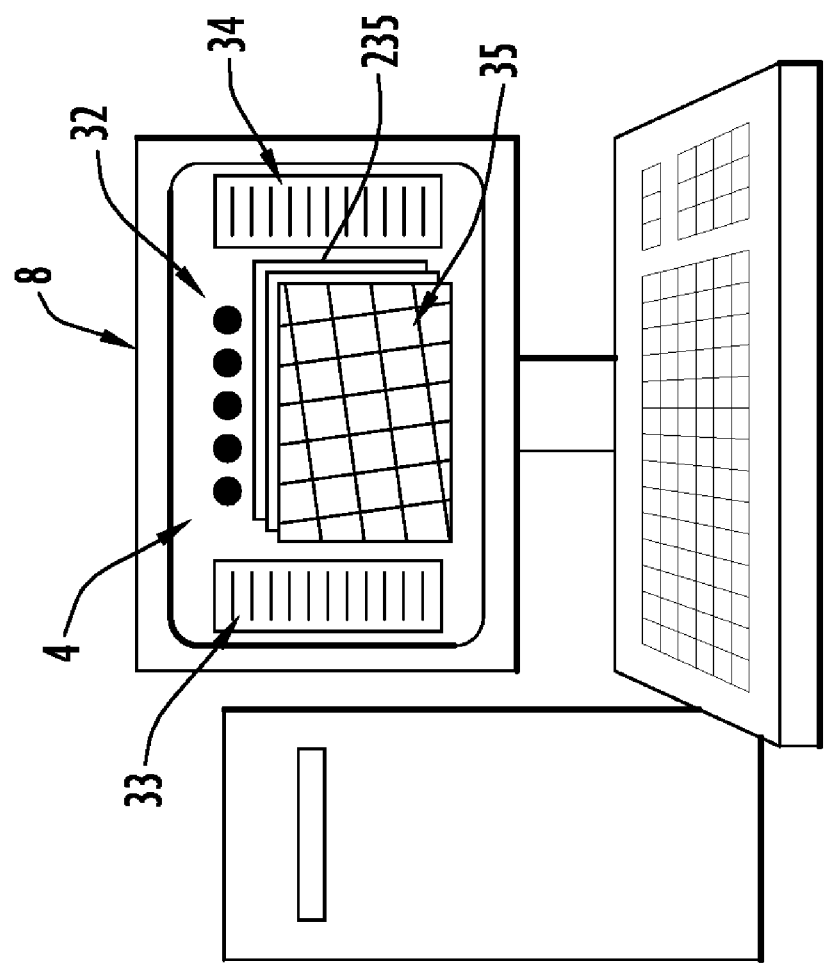
FIG. 8 is a schematic illustration of a geographic overlay system user interface or viewer on an end-user system according to an embodiment of the present invention.

Referring to FIG. 8, viewer 4 is preferably a custom-designed Flash interface for end-user system 8 that is integral to the information system. The viewer includes an SWF file (embedded in a main web or active server page 51) that executes from the end-user system (e.g., via Adobe Flash Player), wherein the files enable interaction with the user and are compiled from a FLA (Flash) file as described below. The use of Flash as the viewing interface results in a highly interactive Graphical User Interface (GUI) that includes client-side map layer rendering, a no page refresh, and a one-page display (e.g., enabling various data display windows to simultaneously interact with each other). Viewer 4 may also dynamically connect to XML, Geography Markup Language (GML) and PHP-based web services to retrieve and render additional map layers and data. The viewer includes a navigable interactive map including tools for map navigation 32, input forms for search queries 33, display areas 34 for search results and interactive vector-based map layers 35. The interactive map layers are overlaid on underlying base map 235 from the mapping system.

Figure 9:
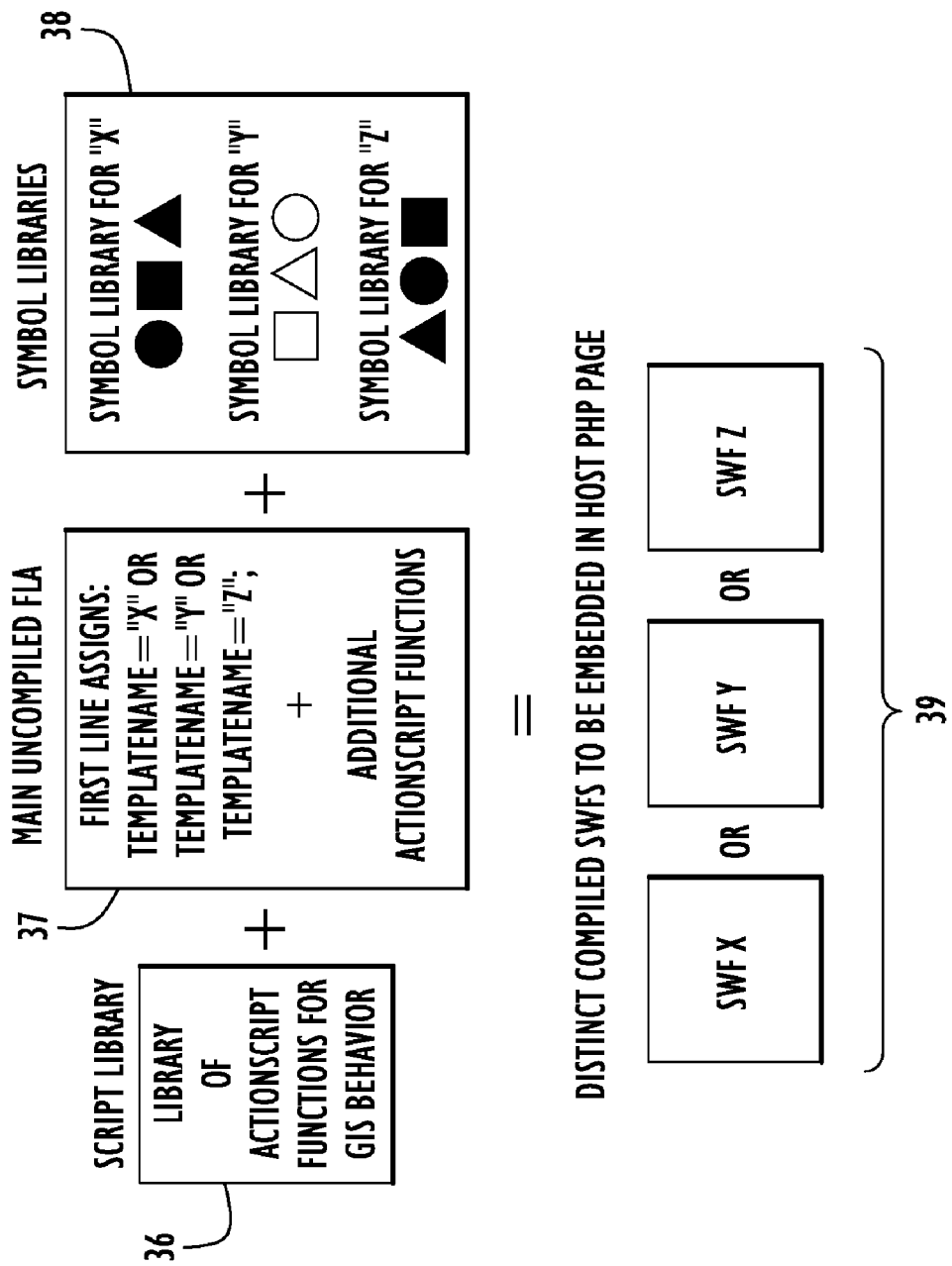
FIG. 9 is a diagrammatic illustration of the manner in which the viewer is compiled according to an embodiment of the present invention.

Viewer 4 includes and executes in accordance with pre-programmed scripts as illustrated in FIG. 9. Specifically, viewer 4 includes and executes in accordance with a library of pre-programmed scripts 36 (e.g., ActionScript functions; a client-side scripting language (similar to JavaScript) and the programming language of Flash) that dynamically render the various map layers and enable the elements (e.g., Flash elements) to move and re-size. The viewer SWF file is generated from one central decompiled Flash file (FLA) 37 that may be compiled as a variety of distinct viewer SWF files 39 for any number of different customized designs and layouts. In other words, although multiple custom-designed information system web sites may look completely different and contain a different range of functions, each of these web sites was compiled from exactly the same decompiled FLA file 37. This is due to the arrangement of the decompiled FLA file. In particular, file 37 includes an include function to access library of scripts 36 (e.g., ActionScript functions) for sending and/or receiving requests from active server (e.g., PHP) pages to dynamically render the various map layers and enable the information system to function as a Geographic Information System (GIS). This library is automatically included when the viewer SWF file is compiled. The initial ActionScript line in the FLA file assigns each customized design/layout a unique template name. This name is utilized and passed as a parameter to various functions to determine the distinct functionality and layout for each compiled SWF file 39. Additional ActionScript functions within file 37 (e.g., distinct from the included library) accept the name of the template as a parameter when that function is called. The called function executes differently depending upon the name of the template received (e.g., these functions include directions for colors, shapes, color gradients, tool tip attributes, font colors and shapes, URL links to graphic objects, JPEG images, video links, symbol selection, rotation, map specifications, raster specifications, photo links, inclusion of different types of components, etc.).

A series of symbol libraries 38 including movie clips, buttons and graphics are positioned within the main SWF stage based upon the name of the template received as a parameter during an initialization script that executes when the web site is initially launched. These movie clips, buttons and graphics provide a distinct look and feel for each distinct information system web site. Once compiled, these elements (e.g., ActionScript library 36, file 37 and symbol library 38) combine to produce a distinct viewer SWF file 39 to be embedded in the host active server (e.g., PHP) page based upon the assigned template name.

Figure 10:
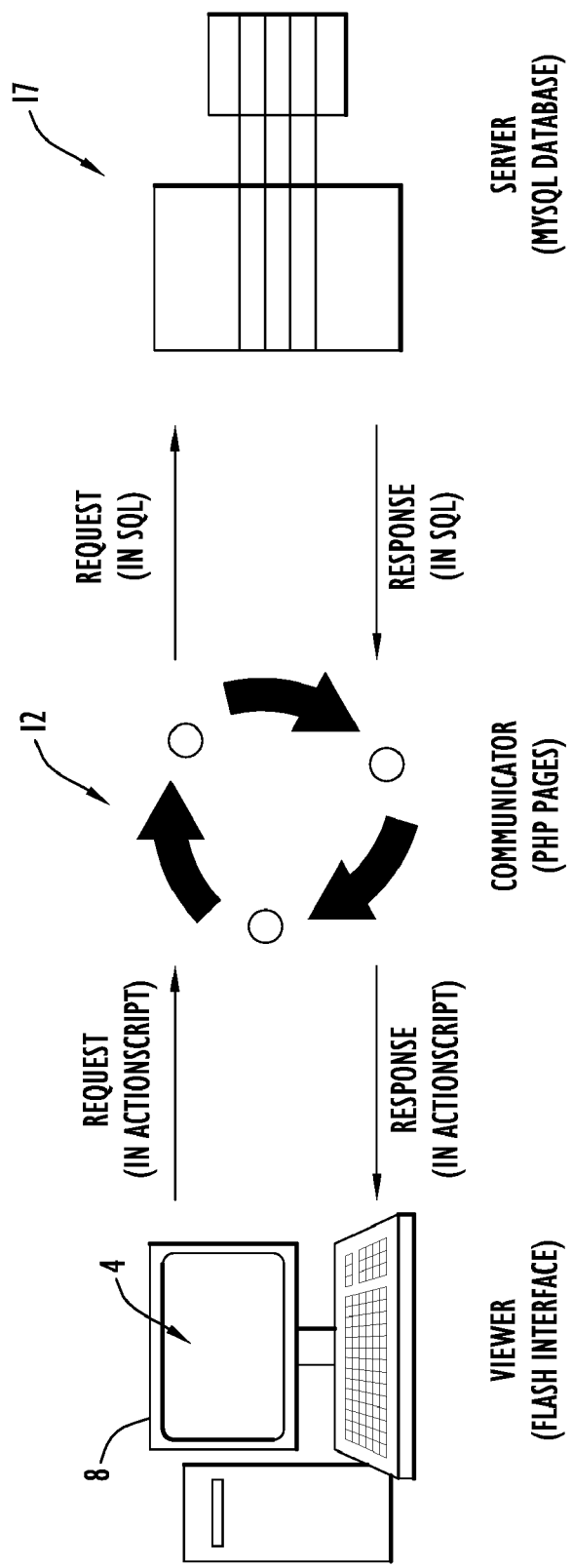
FIG. 10 is a diagrammatic illustration of the manner in which the database system and viewer communicate according to an embodiment of the present invention.
Figure 11:
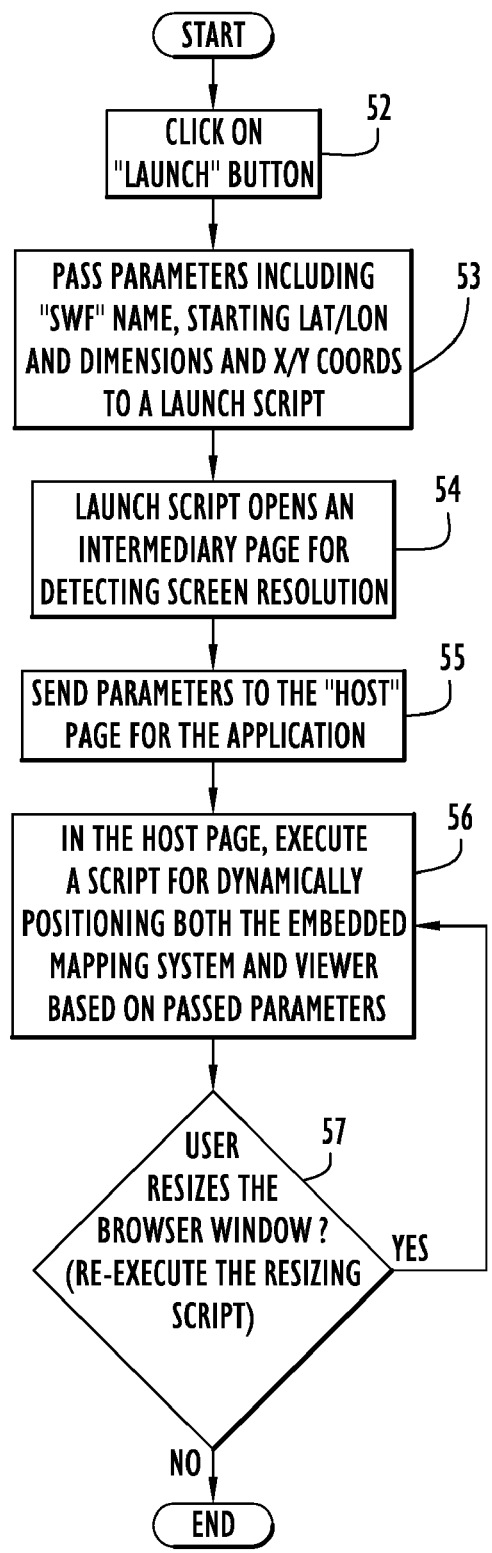
FIG. 11 is a procedural flow chart illustrating the manner in which the viewer and mapping system are aligned in response to a web site launch according to an embodiment of the present invention.

Referring to FIG. 10, communicator 12 typically includes a series of active server (e.g., PHP) pages 51 that are automatically generated by database builder 11 as described above. The active server pages process requests and provide responses between viewer 4 of the end-user system and database system 17. In other words, database system 17 receives database instructions (SQL) from viewer 4 via a script (e.g., ActionScript function) and the communicator PHP page. The communicator receives database results (SQL) from the database system and sends the results to the viewer for display to the user via a script (e.g., ActionScript function). In particular, when a user actuates (e.g., clicks on) a map layer (or vector-based object) within viewer 4 of end-user system 8 to request additional information, a viewer (e.g., Flash ActionScript) function sends this request to a communicator (e.g., PHP) page 51. This page translates the request into an SQL query compatible with database system 17. The database system executes the SQL query, retrieves the corresponding data as a textual data stream and sends the results through the communicator page to a function (e.g., ActionScript function) of viewer 4. Various viewer functions (e.g., ActionScript functions) are subsequently executed to dynamically render polygon, line and point objects based upon the geographic coordinates retrieved from the database system. A series of viewer functions (e.g., ActionScript functions) translate geographic coordinates into X and Y screen (or Cartesian) coordinates to dynamically position the map layer objects properly within viewer 4. The user views the map changes (e.g., overlaid map layers on the underlying base map) and display of data tables, charts and/or videos depending upon the particular function (e.g., ActionScript function).

An example of the operation of the information system is described with respect to a real estate application. By way of example, assume that a user desires to search for all houses that are for sale and include a certain price range, four bedrooms, and are within a certain district of a city. Once the user completes the information within a viewer property search column and initiates the query, the viewer sends a request to a corresponding communicator (e.g., PHP) page. The communicator page queries the database system, and the results are sent through the communicator page to the viewer, formatted in a viewer function (e.g., ActionScript function) and displayed (e.g., overlaid on the underlying base map). The viewer populates the appropriate list with the retrieved properties and displays the properties on the underlying base map by dynamically rendering the interactive vector-based point, line and polygon objects (e.g., using Flash ActionScript drawing and rendering commands) within an overlaying map layer. When a user desires to view the location about a specific house, a property is selected from the property list or a location on the map is actuated (e.g., clicked on), wherein the above process is repeated to retrieve the desired information.

The information system architecture reflects a very efficient and robust manner of performing a web GIS that employs optimal use of client-side and server-side environments. Requests to and from the database system are simple data streams and, therefore, are transmitted very quickly across the Internet. Thus, users do not wait for map images to be uploaded to their browser after being sent from a server (e.g., in contrast to conventional server-side IMS web system 250 of FIG. 3A). Rather, since the viewer is client-side, the results of requests are processed immediately inside a user browser by scripts (e.g., ActionScript functions) that instruct the rendering of map layers and/or the re-positioning or animation of other objects. Further, the speed of the geographic overlay system is very fast.

Referring back to FIG. 2, mapping system interface 2 communicates with mapping system 50. The mapping system may be an interactive client/server web mapping system (e.g., Google Maps, ESRI Arcweb Services, MapQuest, YaHoo Maps, etc.) including dynamically served map tiles (e.g., portions of a map) that are either raster-based (e.g., JPEGs, GIFs, PNGs or MWFs) or vector-based (e.g., SWFs or SVGs) and that align or are arranged within the client or end-user system browser to create a resulting geographic map (e.g., of various desired geographic areas). The mapping system enables a geographic map to be manipulated in various manners including panning, zooming, geocoding, routing, and displaying more detail as a user increases the zoom level. The mapping system preferably includes an Application Programming Interface (API) that enables developers to leverage the mapping functionality and integrate that functionality into web sites. The functionality of the mapping system may be accessed by client-side functions (e.g., JavaScript) typically using techniques (e.g., AJAX) to dynamically display geospatial data received from the mapping system.

The use of JavaScript and AJAX in conventional mapping systems limits the amount of dynamic rendering of vector-based objects from web services or geospatial databases due to memory restrictions and network latency (e.g., the delayed interval between a user request and server response). Thus, these conventional JavaScript/AJAX based mapping systems are only capable of rendering points and lines in a dynamic manner (e.g., points of interests and streets), thereby restricting the capacity of the systems to simple datasets and functions. However, the combination of the mapping system and the dynamic, vector-based information system within the present invention embodiments enables seamless overlaying of multi-national coverage with dynamic polygonal information and overcomes this limitation. In other words, the present invention embodiments render points (e.g., specific locations or points of interest), lines (e.g., streets) and polygons (e.g., geographic areas, such as neighborhoods, towns, counties, etc.) on the map layers that correspond to areas of the underlying base map and provide information associated with those areas. Further, the latency problem is resolved and the speed of the geographic overlay system is enhanced since the system seamlessly engages plural servers (e.g., geographic overlay system, mapping system, etc.) in order to process a request as described below.

Viewer 4 communicates with mapping system interface 2 by transferring commands (e.g., via ActionScript and JavaScript functions), thereby enabling the viewer and mapping system to dynamically align based upon user interaction. The mapping system interface is preferably embedded in the same active server (e.g., PHP) page containing viewer SWF files 39 (FIG. 9), and the viewer and mapping system are dynamically aligned via the use of Cascading Stylesheets (CSS) as described below (e.g., Cascading Stylesheets basically define the manner in which different elements of a web page appear, where plural style sheets may be applied to the same web page). The viewer may be configured (e.g., the Flash Player may employ the "wmode=transparent" property) to ensure that users view the underlying base map produced by the active server page that is hosting the mapping system interface.

Alternatively, the mapping system interface may be incorporated directly inside viewer 4 (e.g., as a Flash-based Component when a Flash-based API option is available). In this case, SWF-based tiles provided by the Flash-based API mapping component are positioned within the lowest background map layer (e.g., under the interactive information system map layers). The viewer and mapping system interface communicate via ActionScript functions (rather than a combination of JavaScript and ActionScript).

The manner in which the mapping system and viewer are aligned is illustrated in FIG. 1. Initially, the mapping system and viewer are positioned and sized in accordance with the parameters passed to the Cascading Stylesheets (CSS) in response to detection of a user screen resolution during the web site launch. In other words, the resulting style sheets are applied to the active server (e.g., PHP) or web page to provide the appropriate display. This process is repeated each time a user attempts to re-size the browser window. Specifically, a launch button or link is actuated by a user at step 52. This action passes a series of parameters (e.g., viewer SWF file name, starting latitude/longitude coordinates and dimensions, X and Y coordinates, etc.) to a client-side launch script (e.g., JavaScript function) at step 53. The launch script opens a temporary intermediary active server (e.g., PHP) page that detects the user screen at step 54. This page may use a series of JavaScript scripts to determine the size of the mapping system map and corresponding viewer SWF file based upon screen resolution and the passed parameters. The page further employs a relocation script to pass the parameters to the host active server (e.g., PHP) page at step 55. The host page executes a script (e.g., JavaScript function) for dynamically positioning the mapping system map and viewer based on passed parameters. Each embedded map object is placed in a particular section (e.g., Div tag) and positioned using a corresponding Cascading Stylesheet (CSS) at step 56. If the user browser is re-sized as determined at step 57, the above repositioning (e.g., step 56) is repeated based upon the new screen size/resolution.

Figure 12:
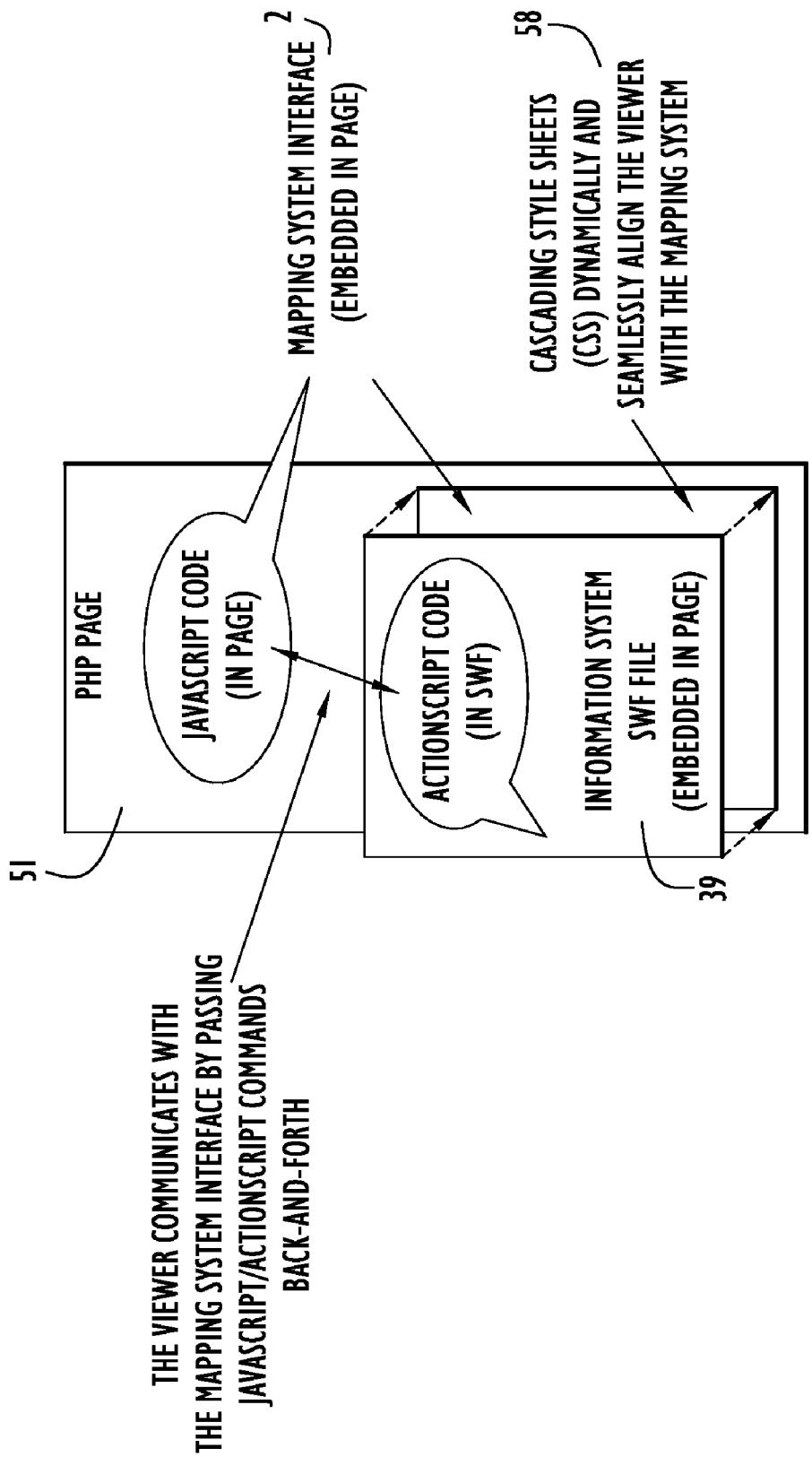
FIG. 12 is a diagrammatic illustration of the communication between the viewer and the mapping system interface according to an embodiment of the present invention.
Figure 13:
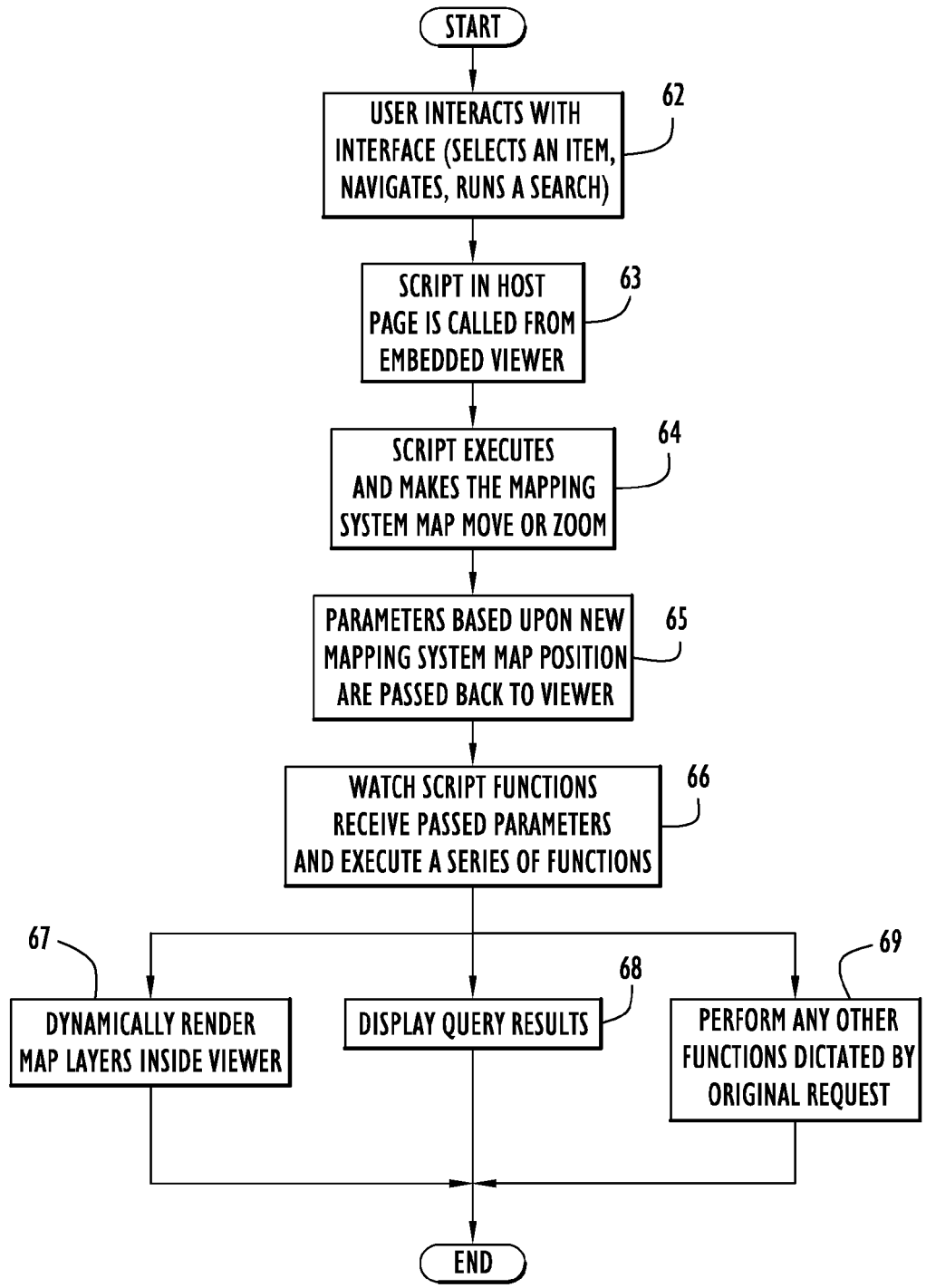
FIG. 13 is a procedural flow chart illustrating the general manner in which a user request entered into the viewer is processed according to an embodiment of the present invention.
Figure 14A:
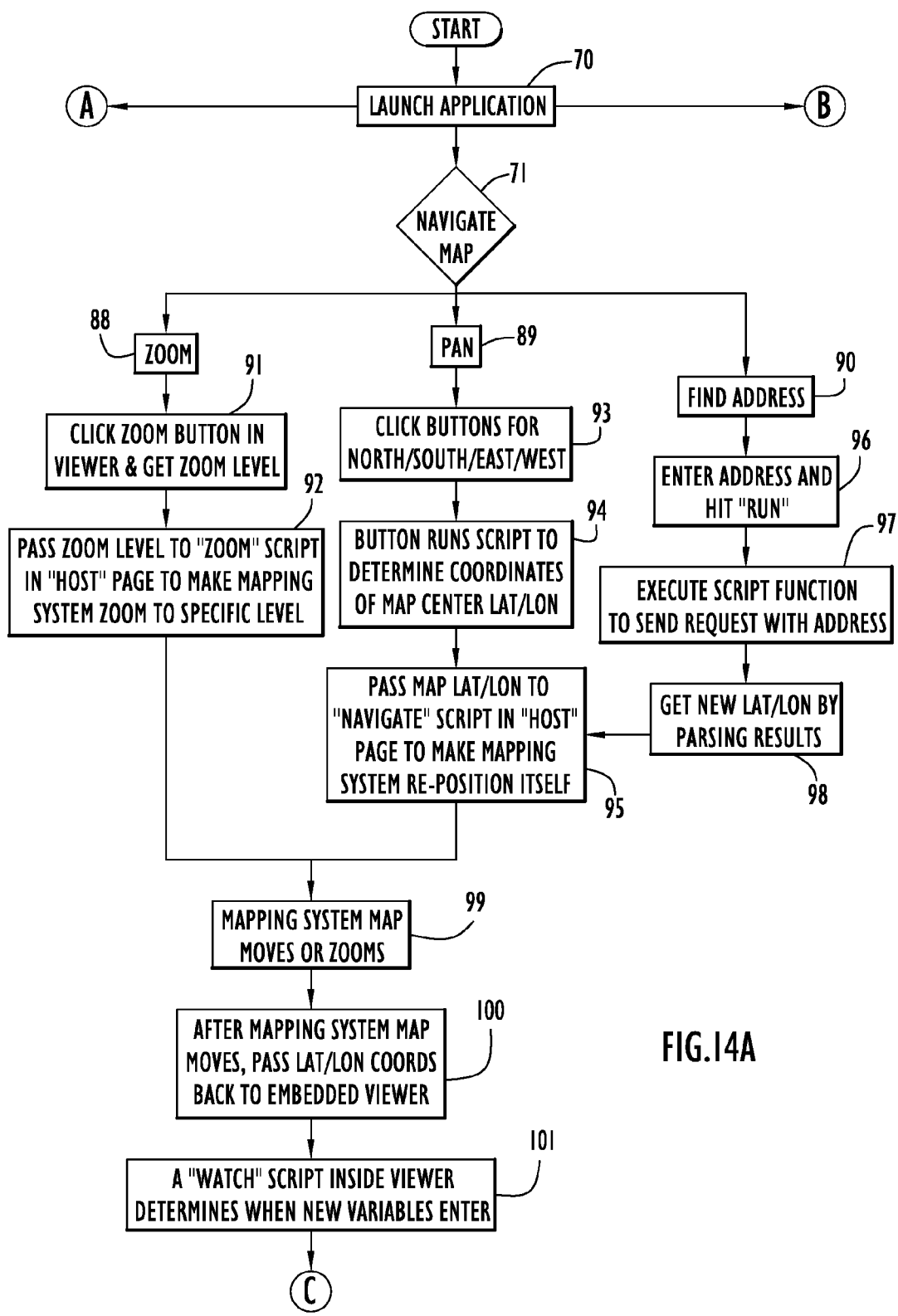
FIGS. 14A-14F are a procedural flow chart illustrating the further manner in which user requests entered into the viewer are processed according to an embodiment of the present invention.
Figure 14B:
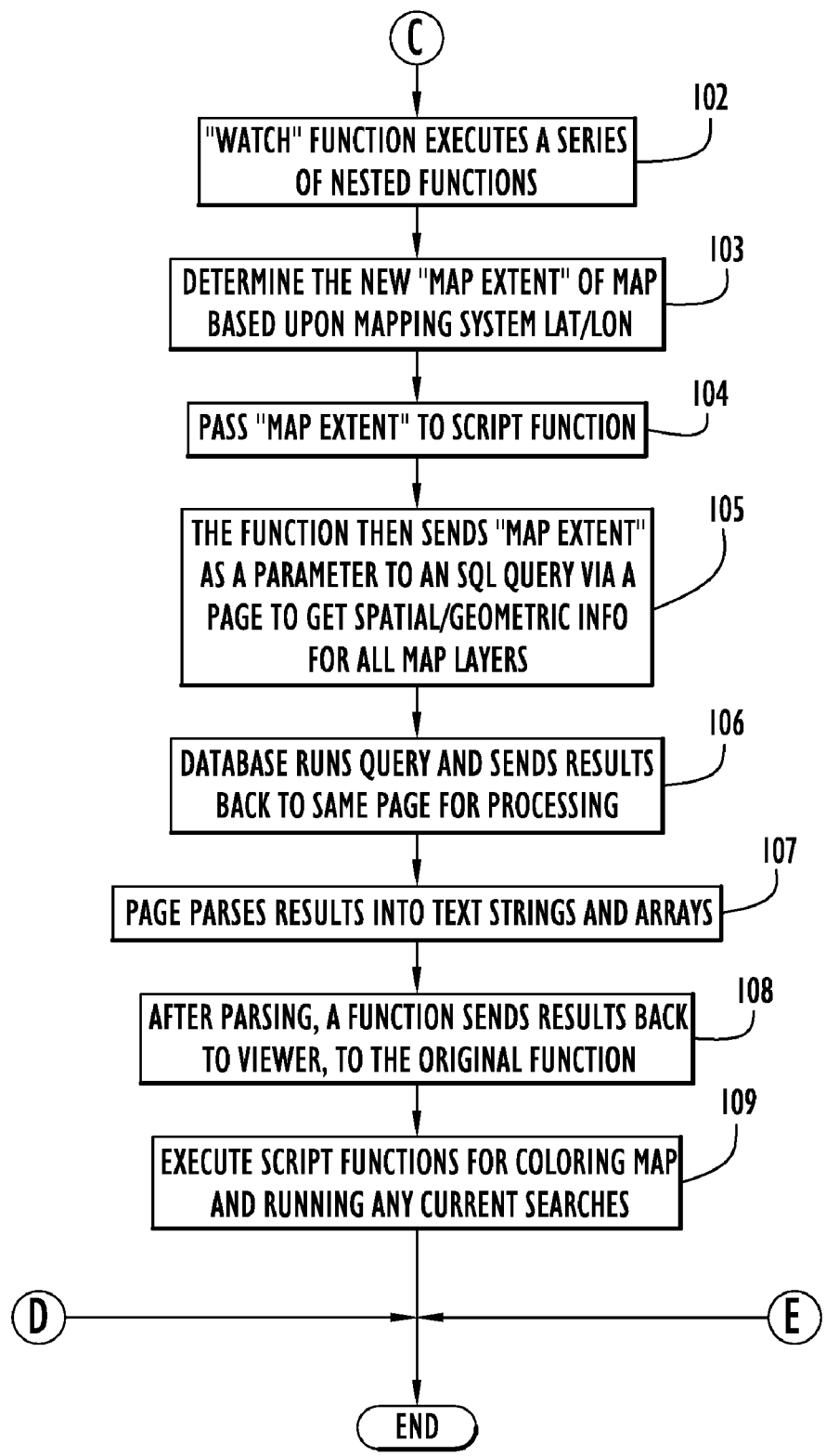
Figure 14C:
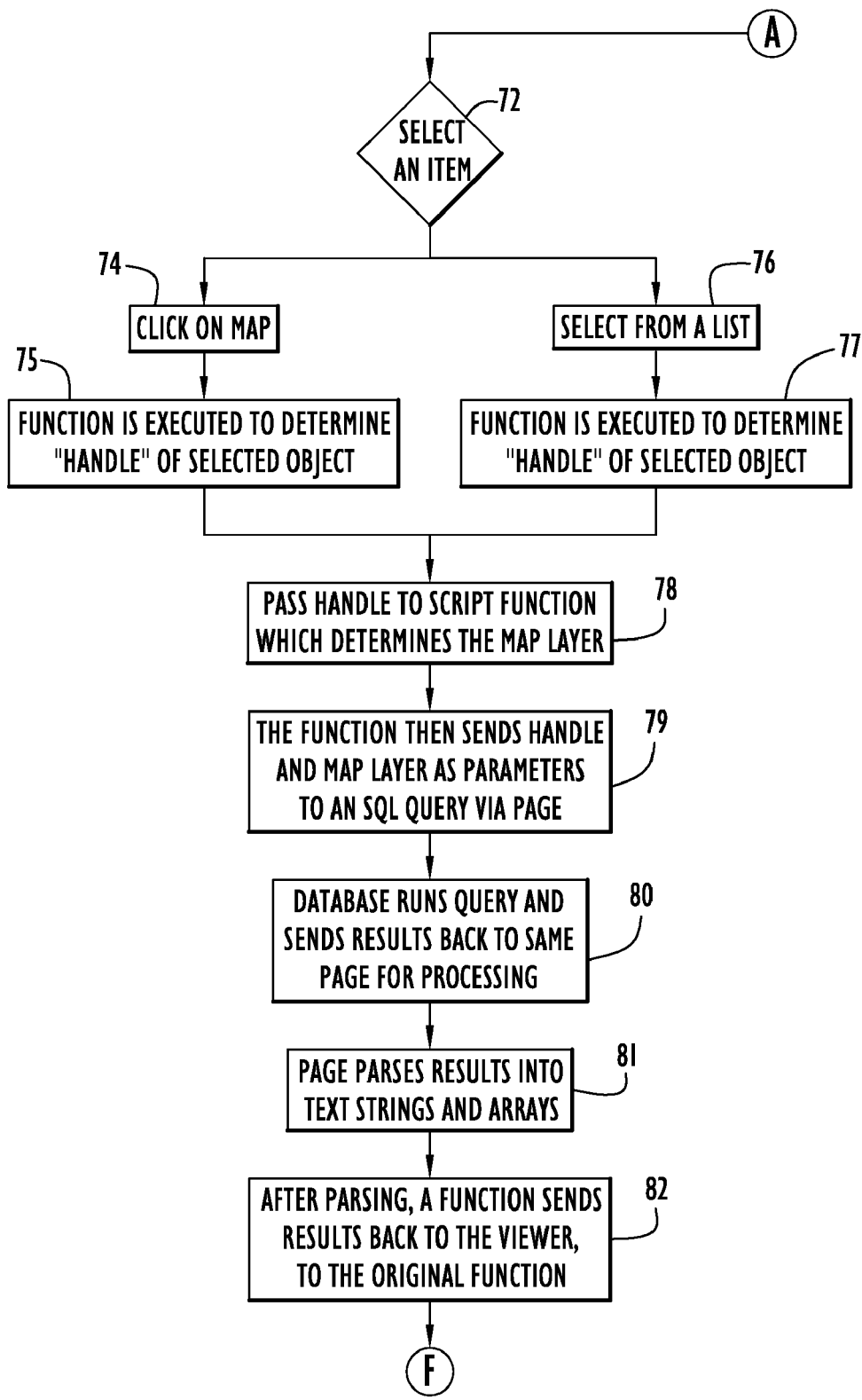
Figure 14D:
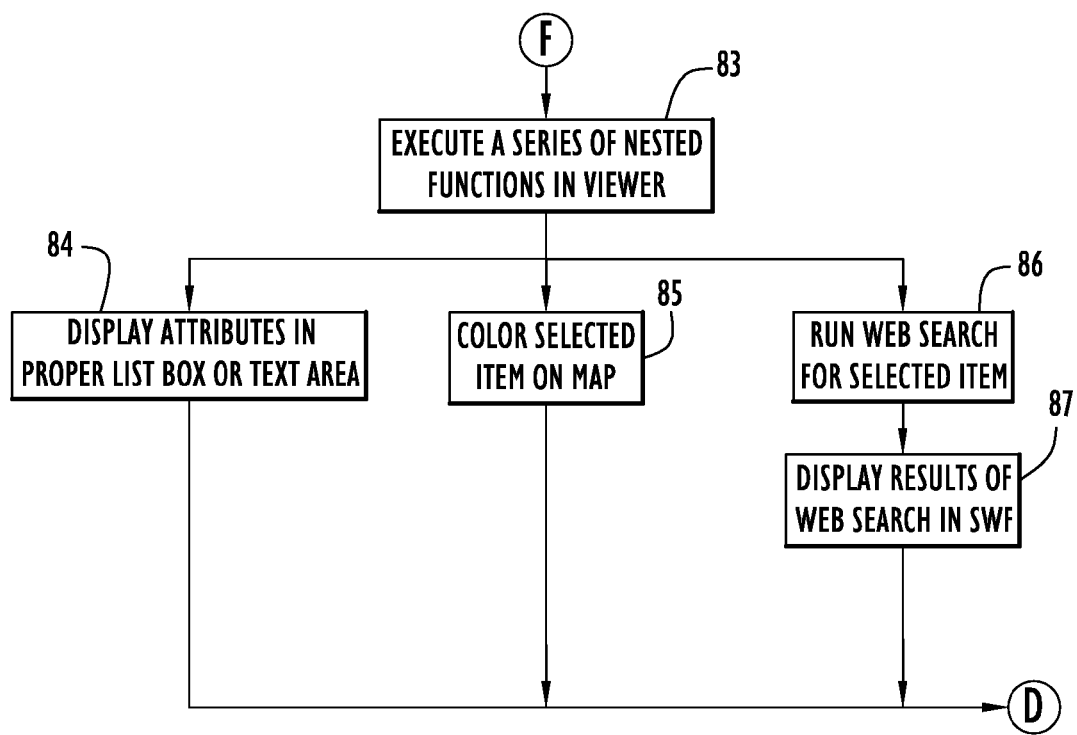
Figure 14E:
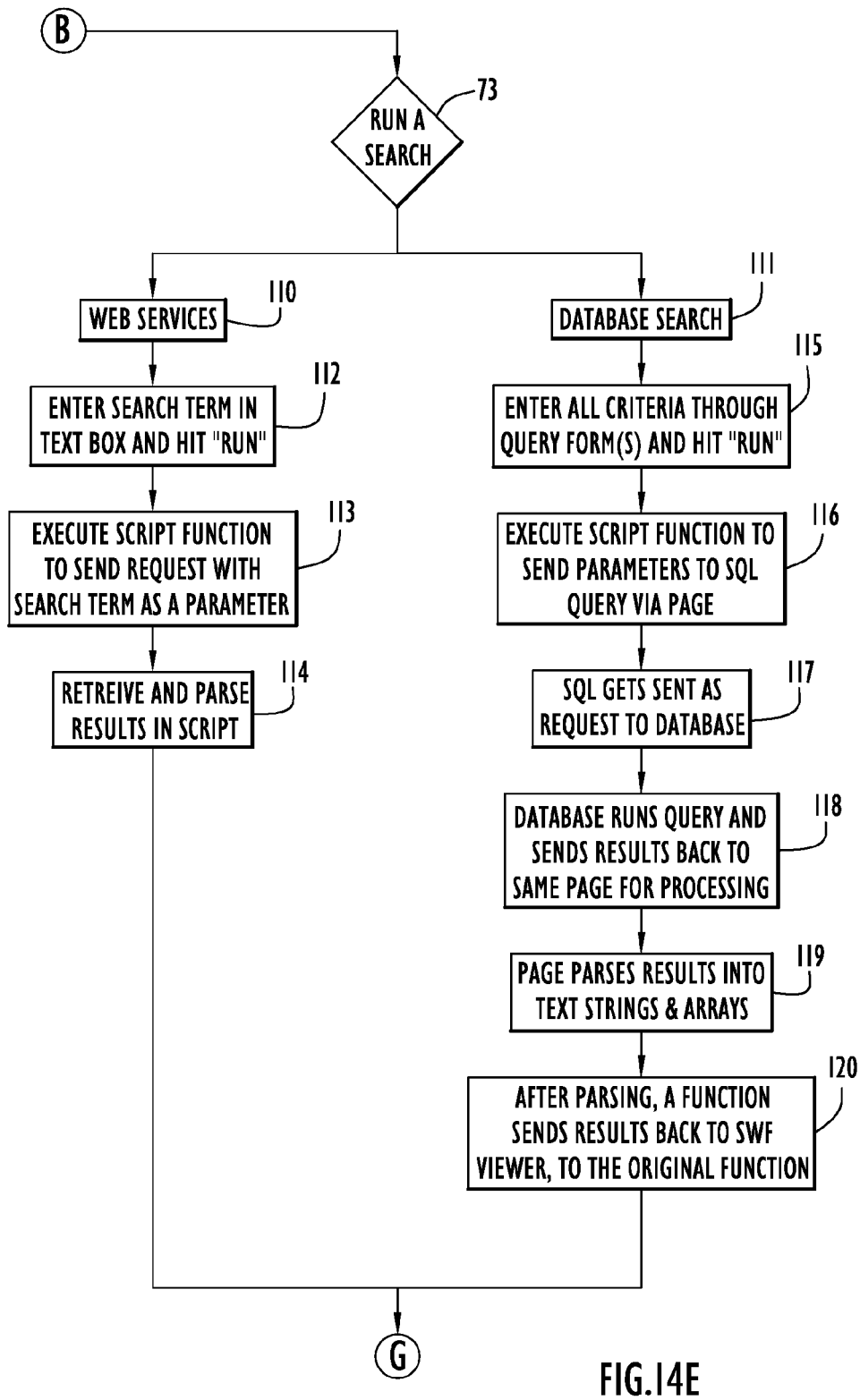
Figure 14F:
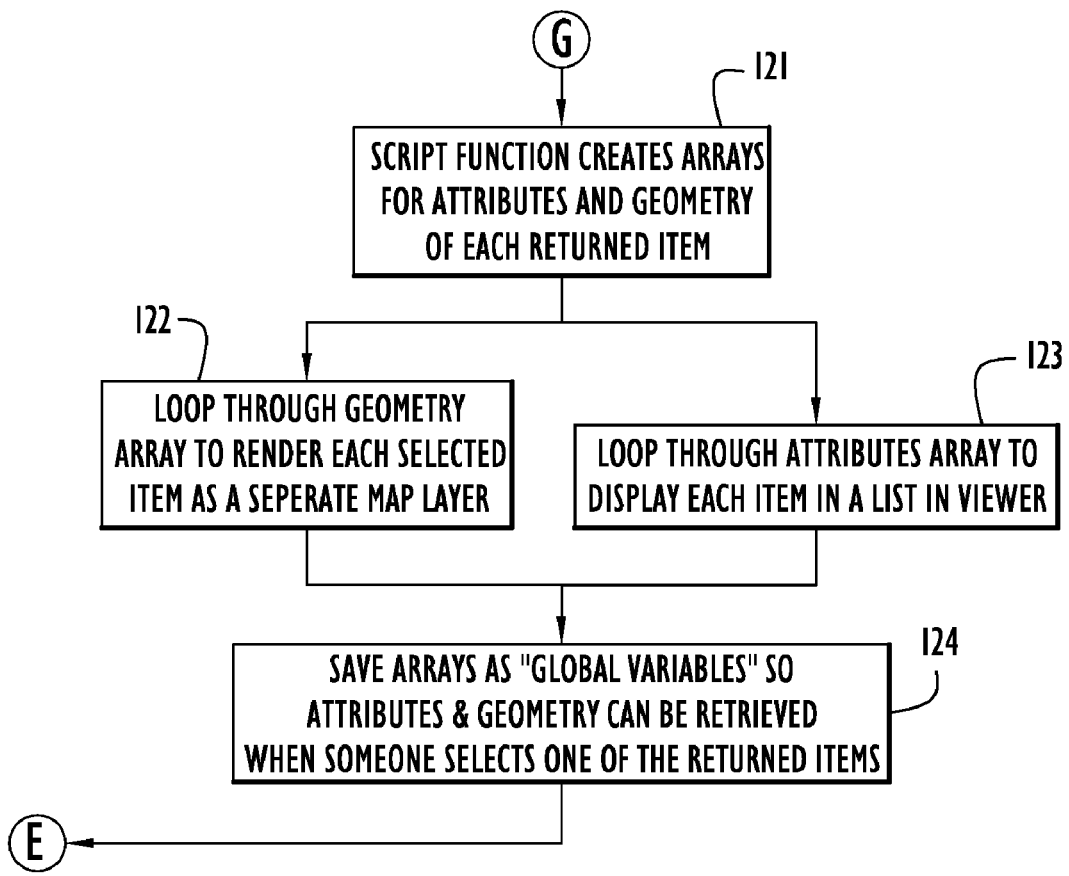

Referring to FIG. 12, once the geographic overlay system web site is launched, the viewer and mapping system interface are embedded within the same hosting active server (e.g., PHP) page, where the viewer and mapping system are aligned via Cascading Style Sheets (CSS) 58. The embedded information system or viewer SWF file 39 (FIG. 9) uses scripts (e.g., ActionScript functions contained within the embedded SWF file) to process commands. The embedded mapping system interface similarly uses scripts (e.g., JavaScript functions) contained within the host page to process commands. The viewer and mapping system interface pass script (e.g., JavaScript/ActionScript) commands in order to communicate with each other (e.g., when the map is manipulated to a different view, etc.).

Operation of the geographic overlay system is illustrated in FIGS. 13 and 14A-14F. Initially, a user visits a geographic overlay system web site for mapping applications, where an appropriate active server page is retrieved for conducting the session on a corresponding end-user system. Embedded viewer files 39 and mapping system interface 2 are utilized by the end-user system to enable display of desired maps and rendering of map layers, while active server pages 51 are utilized by the geographic overlay system or other server hosting the web site to accommodate queries for the database system. An initial map is retrieved based on user inputs by mapping system interface 2 submitting requests to mapping system 50. Viewer 4 displays the resulting map received from the mapping system. Specifically, when a user interacts with a map within viewer 4 on the end-user system (e.g., selects a map item, navigates the map, performs a search, etc.) at step 62 (FIG. 13), a script (e.g., JavaScript function) in the main active server (e.g., PHP) page is called from the viewer (e.g., via the embedded viewer (e.g., SWF) file) at step 63. This script is passed several parameters based upon the user input.

The script executes within the main page and directs the embedded mapping system interface to control the mapping system to alter (e.g., move or re-center, pan, zoom, etc.) the map at step 64. In particular, a request is sent from mapping system interface 2 to mapping system 50 to manipulate the map in a desired fashion (e.g., move or re-center, zoom, pan, etc.). The mapping system retrieves and processes map tiles based upon the request (e.g., map center point, zoom level, pan, etc.). The processed tiles or images are returned to the client browser and positioned within the underlying main active server (e.g., PHP) page. A Maximum Bounding Rectangle (MBR) defining the area of the specific map view is further received from the mapping system. The tiles are assembled within the client browser to form the underlying base map image.

While the tiles are being assembled, a map system interface script (e.g., JavaScript function) passes the new Maximum Bounding Rectangle (MBR) of the specific map view to the viewer as a variable at step 65. The viewer (e.g., via a series of watch script (e.g., ActionScript) functions programmed to determine when a variable changes) receives the changed variable (e.g., MBR) and executes a series of scripts (e.g., ActionScript functions) at step 66. These scripts include the functions of rendering and coloring the map based on new coordinates at step 67, querying the database system and displaying query results in pre-set display grids at step 68 and performing any other functions required to address the original request at step 69.

By way of example, the geographic overlay system may provide information based on National Census geographies. The viewer displays and enables manipulation (e.g., re-center, zoom, pan, etc.) of a base geographic map received from the mapping system as described above. The geographic overlay system retrieves corresponding objects from database system 17 within the view of the base map based on the MBR as described above. The objects are in the form of points (e.g., identifying points of interest), lines (e.g., identifying streets) and polygons (e.g., identifying geographic areas) to overlay the underlying base map and identify specific areas corresponding to the Census boundaries (e.g., blocks, group of blocks, zip codes, etc.). Further, attribute data (e.g., population, demographics, etc.) associated with the retrieved objects is obtained from the database system. The geographic overlay system renders map layers with the attribute information and retrieved objects positioned to overlay the corresponding areas on the base map. The objects may be color-coded or shaded to identify the Census areas and/or associate the areas with attribute information. The viewer displays the base map with the overlaid map layers. The objects within the map layers overlay and identify the corresponding Census areas on the underlying base map, while the attribute information provides information pertaining to those Census areas (e.g., population or demographic information may be displayed for each Census area on the underlying base map view). A particular Census area on the map may be selected (e.g., clicking on the map) to obtain additional information (e.g., incomes, number within households, etc.) for that area. The geographic overlay system retrieves the information from the database system and renders the object associated with the selected area with the additional information in a map layer for display.

More specifically, when the application or web site is launched at step 70 (FIGS. 14A-14F), the user may navigate a displayed map at step 71, select a map item at step 72, or perform a search at step 73. The map may be navigated at step 71 by either zooming at step 88, panning at step 89, or searching for an address at step 90. With respect to zooming, a user actuates (e.g., clicks on) a button in the viewer at step 91. This action executes a viewer parameter function (e.g., ActionScript function) that passes the desired zoom level as a parameter to a mapping system interface zoom function (e.g., JavaScript "zoom" function) embedded in the host active server (e.g., PHP) page at step 92. The zoom function directs the mapping system to adjust the map to the desired zoom level at step 99. Basically, this is accomplished by the mapping system interface sending a request to mapping system 50 (FIG. 2) to manipulate the map in a desired fashion. The mapping system performs the requested manipulation and provides updated mapping information (e.g., updated map images or tiles, MBR, etc.) to mapping system interface 2 in response to the request for display of the adjusted map within viewer 4 as described above.

Alternatively, the map may be navigated by panning in a particular direction (e.g., east, west, north or south) at step 89. A user actuates (e.g., clicks on) a button in the viewer at step 93. This action executes a viewer script (e.g., ActionScript function) to determine a new center of the map extent at step 94. The new map extent information is passed as a parameter to a mapping system interface navigate function (e.g., JavaScript "navigate" function) embedded in the host active server (e.g., PHP) page at step 95. The navigate function directs the mapping system to re-center the map to the desired location at step 99. Basically, this is accomplished by sending a request to mapping system 50 (FIG. 2) to manipulate the map in a desired fashion. The mapping system performs the requested manipulation and provides updated mapping information (e.g., updated map images or tiles, MBR, etc.) to mapping system interface 2 in response to the request for display of the adjusted map within viewer 4 as described above.

The map may be further navigated by searching for an address at step 90. An address is entered into a text box in the viewer and a button is actuated (e.g., clicked on) to initiate the navigation at step 96. This action invokes a viewer address function (e.g., ActionScript function) that passes the entered address as a parameter, via a viewer transmit function (e.g., "send xml" ActionScript function), to an outside XML geocoding web service (e.g., geographical web services, etc.) at step 97. The web service retrieves the latitude/longitude coordinate information of the address and passes the information to the viewer, where the coordinate information (e.g., XML coordinate information) is parsed at step 98. The parsed geographic coordinate information is passed as a parameter to the mapping system interface navigate function (e.g., JavaScript "navigate" function) embedded in the host active server (e.g., PHP) page at step 95. The navigate function directs the mapping system to re-center the map to the desired location at step 99. Basically, this is accomplished by sending a request to mapping system 50 (FIG. 2) to manipulate the map in a desired fashion. The mapping system performs the requested manipulation and provides updated mapping information (e.g., updated map images or tiles, MBR, etc.) to mapping system interface 2 in response to the request for display of the adjusted map within viewer 4 as described above. In the case where mapping system 50 provides the geographical services to locate the entered address, the mapping system may resolve the address, update the map and return updated map information in response to the initial address request.

Once the mapping system updates the map, a mapping system interface listener function (e.g., "onMoveEnd" listener JavaScript function) executes in the host page and passes the latitude/longitude coordinates (e.g., MBR) of the new map position as variables to the viewer at step 100. A viewer watch script (e.g., "watch" ActionScript function) determines when new or changed variables are received at step 101. Upon receiving the changed variables, the watch function passes the variables as parameters to a series of viewer functions (e.g., ActionScript functions) at step 102.

These functions perform various tasks including determining the new map extent for the map layers at step 103. Parameters (e.g., MBR) are passed to the viewer send function (e.g., "sendAndLoadVars" ActionScript function) at step 104 that calls a corresponding active server (e.g., PHP) page to execute a corresponding SQL query for retrieving the geometric coordinates and attribute data for the map layers to be rendered by the viewer in accordance with the manipulated map at step 105. Specifically, the SQL query may include conditional clauses pertaining to the retrieval of attribute information (e.g., based upon the existence of a currently active multi-criteria query that has selected various items from user-selected criteria), and a clause providing the MBR for the specific map view. This query is executed against the coordinate tables in databases 3, 5. Since the database system is a spatial-relational database, the SQL query identifies items spatially within the MBR and satisfying the attribute criteria, and provides the primary database keys and corresponding linking fields (e.g., official ID) for these items. The resulting items may be in the form of point (e.g., identifying and overlaying specific places or points of interest on the underlying base map), line (e.g., identifying and overlaying streets or blocks on the underlying base map) or polygon (e.g., identifying and overlaying geographic areas on the underlying base map (e.g., block groups, Census tracts, zip codes, sub-counties, counties, etc.)) objects.

The resulting keys and linking fields are provided to an intermediary active server (e.g., PHP) page that sends SQL queries to the database system. In particular, the intermediary active server page sends an SQL query for execution against the coordinate tables of databases 3, 5 to retrieve coordinate information for the identified items based on the previously retrieved primary keys. Further, a SQL query is sent for execution against the attribute tables of databases 3, 5 to retrieve attribute information for the identified items based on the linking fields.

The data (or coordinate and attribute information) is retrieved from the database system (e.g., MySQL database) and passed to the initial requesting page at step 106, where the retrieved data is parsed into text strings (e.g., coordinate information) and arrays at step 107. The resulting text strings and arrays are passed, via the page output function (e.g., PHP "print" function), to the original send function (e.g., "sendAndLoadVars" ActionScript function) at step 108. Thus, since the coordinate and attribute information are transferred across the network (e.g., as opposed to image data), the amount of information transferred is significantly reduced.

A series of viewer functions (e.g., ActionScript functions) parse and utilize the coordinate information to render the vector-based objects of various map layers, and may execute any other viewer functions, including rendering selected items and executing searches at step 109. For example, the viewer functions may employ ActionScript "lineto" and "fill" functions to draw, render and set the transparency of the retrieved points, lines and polygons on the map layers. Each item coordinate (e.g., X,Y coordinate) is plotted as a point, while the "lineto" function draws a line between the plotted points. Various other viewer functions (e.g., ActionScript functions) may display the attribute information (e.g., as tables, charts, lists, etc.) during the rendering.

An item may be selected from the map at step 72 by actuating (e.g., clicking on) a map portion at step 74. This causes a viewer script (e.g., ActionScript function) to execute via a viewer detection (e.g., "onMapClick") function at step 75. This function determines a unique ID or handle of the selected map object (e.g., primary key of the selected map object within the coordinate tables of databases 3, 5). Alternatively, an item may be selected from a list at step 76. In this case, a viewer event (e.g., "eventObj") function (e.g., ActionScript function) is triggered to determine the handle of the selected list item at step 77.

The determined handle is passed to a viewer send function (e.g., "sendAndLoadVars" ActionScript function) at step 78. This send function determines the map layer corresponding to the handle, and sends the handle and map layer as parameters to a corresponding active server (e.g., PHP) page at step 79. This page includes an SQL query for transference to database system 17 (e.g., MySQL database). The coordinate tables of databases 3, 5 are queried and the coordinates for the selected map object and the corresponding linking fields are returned. The linking fields are utilized as a parameter within a subsequent SQL query executed against the attribute tables of databases 3, 5 in order to retrieve the attribute information for the selected map object. The database system returns the results to the requesting page for parsing and processing at step 80. This is accomplished in substantially the same manner described above. The page parses the returned items, including geometry, as text strings (e.g., coordinate information) and arrays at step 81. Once the parsing and processing is completed, a page output function (e.g., "print" PHP function) sends the text strings and arrays to the original send function (e.g., "sendAndLoadVars" ActionScript function) at step 82. This function calls various other viewer functions (e.g., ActionScript functions) at step 83 to perform tasks including displaying attributes in a list box at step 84, rendering selected items as vector objects on the map layers at step 85, or executing dynamic web searches that are keyed to specific identifying attributes of the selected item at step 86. These search results are displayed in a list box inside the viewer at step 87. The rendering may be accomplished in substantially the same manner described above.

A search may be performed at step 73. The search may use an XML-based web service at step 110, or database system 17 (e.g., MySQL database) at step 111. In the case of the web service, a search term is entered in a text box and a button is actuated (e.g., clicked on) to initiate the search at step 112. This action triggers a viewer search function (e.g., ActionScript function) that passes the entered search string as a parameter, via the viewer transmit function (e.g., "send xml" ActionScript function), to an outside XML web service at step 113. This web service retrieves the desired information and passes the information to the viewer, where the information (e.g., XML) is parsed at step 114.

With respect to a database search at step 111, search criteria are entered within an input query form on the viewer and a button is actuated (e.g., clicked on) at step 115. This action enables the search criteria to be passed to a viewer send function (e.g., "sendAndLoadVars" ActionScript function). This function sends the criteria as parameters to a corresponding active server (e.g., PHP) page at step 116. This page provides an SQL query (with the search criteria) to database system 17 (e.g., MySQL database) at step 117. The database system executes queries (e.g., against the coordinate and attribute tables of databases 3, 5) and sends the results to the requesting page for parsing and processing at step 118. This is accomplished in substantially the same manner described above. The page parses the returned items, including geometry, as text strings (e.g., coordinate information) and arrays at step 119. Once the parsing and processing is completed, the page output function (e.g., a "print" PHP function) sends the text strings and arrays to the original viewer send function (e.g., "sendAndLoadVars" ActionScript function), where the strings and arrays are passed to further viewer functions (e.g., ActionScript functions) for further processing at step 120 (e.g., as dynamically rendered point, line and polygon objects, tiled raster imagery, or text in reports, charts or graphs) as described below.

Once the results from the search (e.g., web service or database) are parsed, a viewer partition script (e.g., ActionScript function) divides the results into arrays of attribute and geometric coordinates at step 121. The geometric coordinate array is passed to a viewer rendering function (e.g., ActionScript function) that loops through each coordinate element and renders that element as a vector object within the map layers at step 122. The attribute array is passed to a viewer display function (e.g., ActionScript function) that loops through each item and displays that item in a text list at step 123. The rendering may be accomplished in substantially the same manner described above. The respective arrays are saved as global variables at step 124 to enable subsequent selections from the list (e.g., step 76) or the map (e.g., step 74) to be displayed or rendered from information within the appropriate saved global arrays.

The geographic overlay system may include various modules (e.g., in the form of viewer files, PHP pages, Action- Script, JavaScript, etc.) to enhance the overall functionality. For example, the geographic overlay system may include an ortho photograph module to enable users to incorporate raster-based ortho photographs stored within database system 17 (or other database) into the viewer, thereby enabling the system to accommodate raster imagery. In particular, the ortho photograph module employs tiling techniques to enable users to incorporate raster-based ortho photographs into the viewer and provides seamless integration with the overlaying vectorized map layers and dynamic panning and zooming of the vector and raster layers. The tiling further aligns raster images within the viewer that are dynamically retrieved from the database system based upon geographic coordinate information. The viewer sends requests to the database system in accordance with user actions to dynamically retrieve raster-based aerial photograph tiles from the database system in a manner similar to that described above (e.g., via active server pages, etc.). These requests include various parameters (e.g., geographic coordinates, zoom level, etc.). Raster images of different resolutions are selected based upon the zoom level and returned to the viewer. Several raster tiles may be sent to the viewer simultaneously and are dynamically assembled in the viewer to construct the image.

Further, the geographic overlay system may include a geocoding module to enable single and plural address dynamic geocoding (e.g., assigning geographic coordinates based on location information). This module performs geocoding by estimating the location in which to dynamically render a point. The location is determined from the estimated distance of the desired address along a line segment extending between end points with known addresses. A remote update feature enables a data table (e.g., DBF, CSV, EXCEL, etc.) with address coordinates to be remotely uploaded to the database system, geocoded and displayed as a vectorized point layer.

Moreover, a business module may be included within the geographic overlay system. This module is coupled to a multi-year nation-wide business database that may be dynamically aggregated by number of jobs, quantity of businesses and other labor force statistics for any selected geography across a time interval (e.g., span of years, etc.). The database may be part of database system 17 or an independent database. Users may select a geographical area from the map and retrieve reports, charts and graphs about the distribution of business data within that district over the desired time interval.

Figure 15:
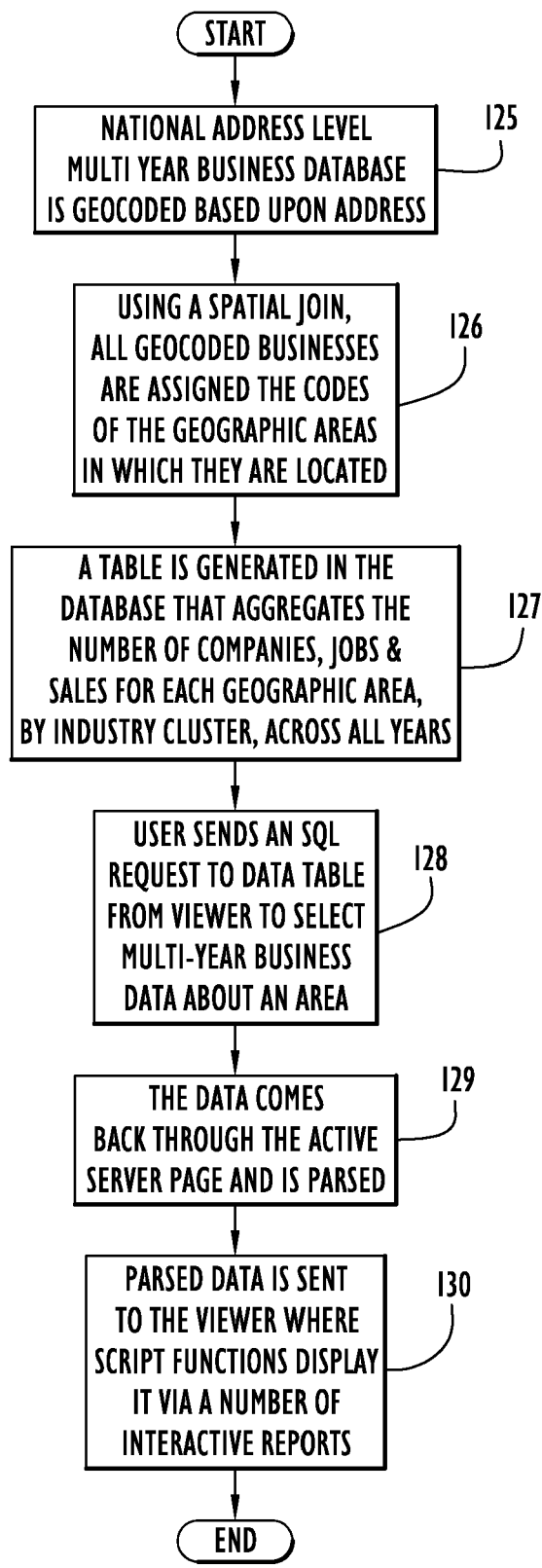
FIG. 15 is a procedural flow chart illustrating the manner in which user-requested business information within a time interval is retrieved and overlaid on a corresponding map according to an embodiment of the present invention.

Referring to FIG. 15, address level business data is geocoded and stored in an attribute table of a database (e.g., handled by database system 17) at step 125. Each geocoded data represents a corresponding business entity (e.g., company, corporation, etc.) from a specific year. Thus, a business entity appears in the database for each year of existence. The attribute data may include industry type (e.g., by SIC and NAICs codes), number of employees and amount of sales. Each geocoded business is spatially assigned a corresponding code pertaining to the various districts in which the business entity is located (e.g., Census tract number, zip code, block number, parcel number, etc.) at step 126. An additional attribute table is generated in the database system based upon this geocoded business data that aggregates the number of business entities, number of jobs and total sales for each geographic area by industry cluster (e.g., assigned by NAICs codes) across all years at step 127. This table is utilized to process requests sent by users after selecting an area from the map.

Once a geographical area from the map is selected (e.g., by clicking on the map, selecting an area from a list, performing a buffer-based selection, etc.), an SQL request is sent to database system 17 via a corresponding active server page in substantially the same manner described above to extract (e.g., from the business attribute tables) the aggregated business data across multiple-years for the selected area at step 128. The resulting data is sent to the page and is parsed at step 129. The parsed information is further transmitted to the viewer, where various viewer functions (e.g., ActionScript functions) display the information in a number of interactive reports about the selected area at step 130. These reports may be viewed as interactive tables or charts, exported as text files and PDF files or printed. The interactive tables and charts typically include a list of business entities within the selected area, and a distribution of jobs, count of businesses and other labor force statistics grouped by industry cluster. The interactive features include the ability for users to switch between years, switch between statistics, and view a dynamically-generated time graph showing the growth and/or decline of industries across time for a selected statistic.

In addition, the geographic overlay system may include a time series thematic mapping module that creates a dynamically-generated series of year-based map layers. The map layers are shaded thematically according to a specific statistic (e.g., number of jobs, count of businesses, demographic characteristics, real estate characteristics, etc). An interactive time-line feature enables users to easily switch between years and view the change in spatial distribution of data via thematic maps.

Figure 16:
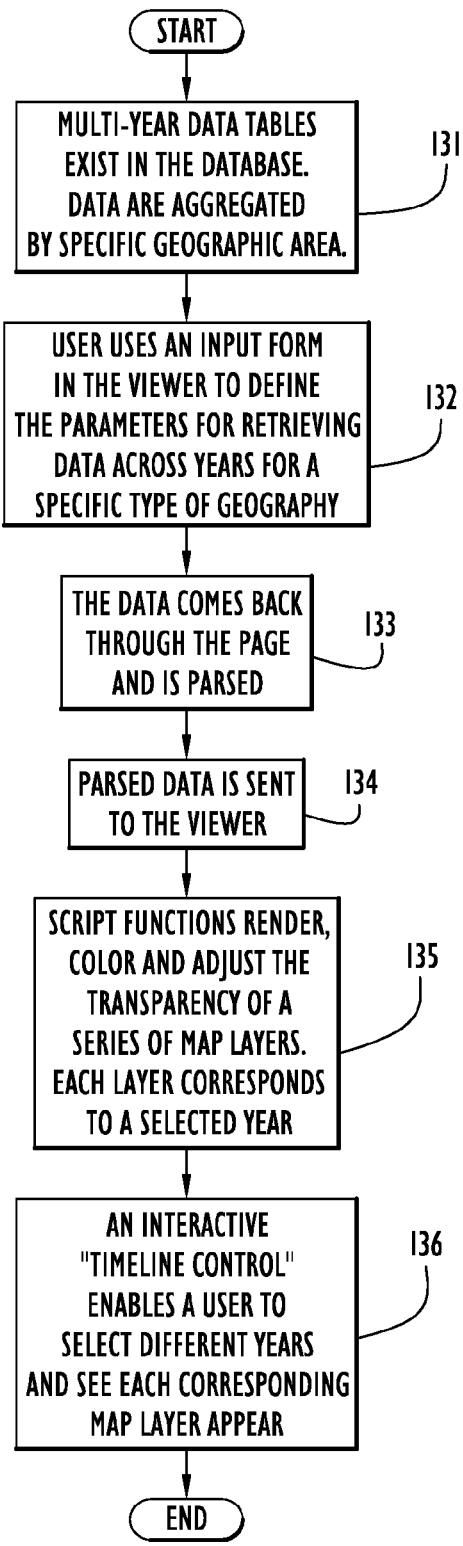
FIG. 16 is a procedural flow chart illustrating the manner in which user-requested information over a specific time interval is retrieved and overlaid on a corresponding map according to an embodiment of the present invention.

As illustrated in FIG. 16, thematic map layers are generated dynamically from a multi-year data attribute table in database system 17 at step 131. In order to generate the thematic map layers, parameters are entered via an input form on the viewer at step 132. The form is utilized to identify the type of geographic area to map (e.g., Census tracts, zip codes, parcels, etc), the time-series database to map, statistics to map (e.g., demographics, economics, real estate, etc) and the specific years to map. Once the form is completed and a button is actuated (e.g., clicked on), an SQL request is sent to database system 17 via a corresponding active server page in substantially the same manner described above to retrieve the data (e.g., from the multi-year data attribute table) for the various years, aggregated by the selected statistic for the desired geography. The resulting data is sent to the page as a textual data stream with geographic coordinates and is parsed at step 133. The parsed information is further transmitted to the viewer, where various viewer functions (e.g., ActionScript functions) dynamically draw, color and adjust the transparency of a series of map layers, corresponding to the selected years at step 135. The thematic map layers are drawn in stacked relation (e.g., directly on top of one another) with only one year visible at a time. An interactive timeline control enables a user to select different years and view the corresponding thematic map layer for the selected year, thereby displaying the thematic spatial distribution of data for each selected year at step 136.

The geographic overlay system may further enable a user to define geographic areas on the displayed base map. In particular, a user may utilize an input device (e.g., keyboard, mouse, etc.) to draw or indicate a desired area on a displayed map or map layer. Viewer functions (e.g., ActionScript functions) detect the indicated area and determine the MBR for the area. The MBR is utilized to retrieve the items (e.g., points, lines, polygons, etc.) within the indicated area and corresponding attribute information from database system 17 in substantially the same manner described above. The retrieved items are rendered within a map layer with the attribute information for display in substantially the same manner described above. The user may subsequently select a map object within the indicated area to obtain additional information for the selected object in substantially the same manner described above. In addition, the indicated area may be saved in the geographic overlay system as a newly defined boundary.

It will be appreciated that the embodiments described above and illustrated in the drawings represent only a few of the many ways of implementing a system and method of overlaying and integrating data with geographic mapping applications.

The computer systems (e.g., geographic overlay system, mapping system, end-user systems, etc.) employed by the present invention embodiments may be implemented by any quantity of any personal or other type of computer system (e.g., IBM-compatible, Apple, Macintosh, laptop, palm pilot, etc.), and may include any commercially available operating system (e.g., Windows, OS/2, Unix, Linux, etc.) and any commercially available or custom software (e.g., browser software, mapping software, geographic overlay system software, etc.). These systems may include any types of monitors and input devices (e.g., keyboard, mouse, voice recognition, etc.) to enter and/or view information.

It is to be understood that the software for the computer systems of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry. The various functions of the computer systems may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among end-user systems and server systems (e.g., client-side or server-side). The modules may be in the form of any suitable software or instructional type code (e.g., scripts, functions, procedures, sub-routines, web or active pages, etc.), where the modules may include any desired names (e.g., the specific names of the functions utilized herein are exemplary and merely utilized for descriptive purposes). The software and/or algorithms described above and illustrated in the flow charts may be modified in any manner that accomplishes the functions described herein. In addition, the functions in the flow charts or description may be performed in any order that accomplishes a desired operation.

The software of the present invention embodiments may be available on any device or apparatus with a recordable or computer readable medium (e.g., magnetic or optical mediums, magneto-optic mediums, floppy diskettes, CD-ROM, DVD, memory devices, etc.) for use on stand-alone systems or systems connected by a network or other communications medium, and/or may be downloaded (e.g., in the form of carrier waves, packets, etc.) to systems via a network or other communications medium.

The communication network may be implemented by any quantity of any type of communications network (e.g., LAN, WAN, Internet, Intranet, VPN, etc.). The computer systems of the present invention embodiments may include any conventional or other communications devices to communicate over the networks via any conventional or other protocols. The computer systems may utilize any type of connection (e.g., wired, wireless, etc.) for access to the network.

The databases may be implemented by any quantity of any conventional or other databases (e.g., relational, hierarchical, etc.) or storage structures (e.g., file, data structure, etc.), may be arranged in any fashion and may store any desired information (e.g., national or local jurisdictional information, census data, business data, etc.). The databases may include any quantity of any types of tables containing any desired information. The tables may include any quantity of keys, where any suitable field may serve as a key for the table. The tables may be related in any suitable fashion and include any quantity of linking fields, where any suitable fields may serve as a linking field between tables. The geographic coordinate information may be based on any suitable location scheme (e.g., longitude and latitude, etc.). The database system may retrieve requested information in any desired fashion and based on any suitable keys (e.g., retrieve information in any desired order, utilize any keys in any order to retrieve information, access any tables in any order, etc.). The databases may utilize any suitable query language, where any suitable parameters may be utilized in the queries to retrieve information (e.g., coordinates, attributes, MBR, etc.). The data within the databases may be combined or aggregated based on any desired criteria (e.g., time intervals, specific statistic, etc.).

The mapping system may be implemented by any conventional or other mapping system (e.g., Mapquest, Google Maps, etc.) capable of communication with the geographic overlay system. Alternatively, the geographic overlay and mapping systems may be implemented as an integral system. Further, the geographic overlay system may communicate with or include any geographical web services system for access to various geographical services (e.g., address locator, geocoding, etc.).

The viewer may employ any suitable interface (e.g., Flash, etc.) to communicate with the geographic overlay system server and render the map layers. The viewer functions may be implemented in any suitable computer programming or scripting language (e.g., ActionScript, etc.). The viewer may be embedded in any fashion within any modules of the system (e.g., pages, scripts, etc.) or be a stand-alone module. The viewer may be constructed in any desired fashion based on any quantity of compiled or uncompiled files (e.g., libraries, scripts, etc.). The viewer may render any quantity of map layers with any types of object geometries (e.g., points, lines, polygons, circles, ellipses, etc.) in any desired fashion (e.g., stacked, side by side, etc.) over an underlying base map. The viewer may provide any suitable functions for the user (e.g., map navigation tools, searches, display of search results, etc.). The functions may be actuated by any suitable mechanisms (e.g., buttons, etc.) displayed at any suitable locations. The underlying map may be navigated in any desired fashion (e.g., zoom, pan, re-center, etc.), while areas may be selected by any suitable input device (e.g., keyboard, mouse, etc.). The viewer may communicate with the database system in any desired fashion (e.g., directly, through various web pages or protocols, etc.). The viewer may provide any suitable mechanisms to view various time-based information or information relating to a specific statistic (e.g., time-line control, etc.). Further, the geographic overlay system may produce any types of reports in any desired formats (e.g., charts, documents, graphs, interactive reports, etc.). The reports may be rendered in a map layer overlaid with the base map.

The mapping system interface may employ any suitable interface or API to communicate with any conventional or other mapping system. The mapping system interface functions may be implemented in any suitable computer programming or scripting language (e.g., JavaScript, etc.). The mapping system interface may be embedded in any fashion within any modules of the system (e.g., pages, scripts, viewer, etc.) or be a stand-alone module. The mapping system interface may communicate with the viewer in any suitable fashion (e.g., commands, Cascading Style Sheets, etc.) for alignment or other purposes.

The database builder may receive any quantity of files containing any desired information to populate any conventional or other databases. The files may be in any desired format (e.g., shapefile, etc.). Further, the database builder may generate any suitable computer statements (e.g., PHP or other code, web pages, etc.) for operation of the system. The database builder may be implemented in any suitable computer language and utilize any desired user interface (e.g., prompts, menus, GUI, etc.). The user interface may include any quantity of any conventional or other input mechanisms and displays arranged in any desired fashion, and may enable a user to specify any desired properties for the map layers (e.g., order, layers associated with queries, etc.).

The map layers may include any quantity of any objects of any geometries (e.g., points, lines, polygons, circles, ellipses, any combinations of these, etc.). The objects may be rendered at any desired locations and in accordance with any suitable techniques (e.g., vector-based, etc.). Any quantity of map layers may be overlaid with the base map, where each layer may include and/or be associated with any desired objects and/or information. The layers may be overlaid with maps from any suitable sources (e.g., generated by mapping systems, internally generated by the geographic overlay system, raster images or photographs, etc.). The map layers may provide objects and/or information associated with any quantity of desired map areas. The map layers or objects may be coded or keyed (e.g., shaded, color-coded, etc.) in any fashion to identify areas on the underlying base map and/or associate the areas with displayed attribute information. The viewer may render the map layers based on any suitable information pertaining to the objects (e.g., points, lines, polygons, etc.) received from the geographic overlay system (e.g., coordinate or other location information, attribute information, etc.). The geographic overlay system may provide any suitable information (e.g., object information, location or coordinates, attribute information, etc.) to enable the viewer to render the map layers, wherein the amount of information transferred is preferably significantly reduced (relative to the amount of information required to transfer an image).

The geographic overlay system may employ any suitable web site to interact with a user. The web site may be arranged in any fashion and provide any desired information within the viewer. The web site may include any embedded modules (e.g., viewer, mapping system interface, etc.). The business module may display any desired data aggregated based on any desired property and for any desired time interval (e.g., years, etc.). The thematic module may display any quantity of layers, where each layer may be associated with any desired information spanning any time interval (e.g., one or more years, etc.). The map layers may be coded (e.g., shaded, color-coded, etc.) in any fashion, and may be displayed in any quantity to cover any desired time interval (e.g., two layers may be displayed each encompassing a year to display data for a two year time interval, etc.).

The viewer and underlying databases may be customized for unique needs and, therefore, may provide for a variety of alternative embodiments. Users may include any number of spatial and relational map layers to enhance the Census spatial-relational database and covering any breadth and scale of geography to develop a highly detailed and comprehensive database. These datasets may be tabular to provide data that conforms to existing census boundaries, or spatial to provide additional polygon, point or line layers to the existing system layers. For example, a statewide or National parcel layer could be accommodated by the system. Further, a Statewide or National database of multi-year business or real estate information may be added to the relational database, thereby allowing dynamic tabular, spatial and temporal analysis and display. In addition, the system can dynamically integrate spatial layers and datasets that are brought in via web services to enhance a local spatial-relational database. Furthermore, a custom-designed database builder back-end GUI interface may be employed to automate database updates.

The geographic overlay system may include or be utilized with any suitable applications that can benefit from a spatial component in decision-making. This includes, but is not limited to: Real Estate; Economic Development; Workforce Development; City Planning; Public Works and Utilities; Location-Based Services; Parcel Data Portals; Surveying; Hydrology; Transportation and Land Use Planning; Demographics and Census; Imagery; Street/Address Location; Forestry; Oceans; Environmental; Health; Business; Agriculture; Public Safety; and Homeland Security.

From the foregoing description, it will be appreciated that the invention makes available a novel system and method of overlaying and integrating data with geographic mapping applications, wherein a geographic overlay system provides a detailed geographical and data profile of a local setting.

Having described preferred embodiments of a new and improved system and method of overlaying and integrating data with geographic mapping applications, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A system for integrating information with a geographic map comprising:
    a server computer system including:
        a database system configured to:
            store coordinate and attribute information associated with map objects for a geographic map provided by a mapping system from among a plurality of different mapping systems;
            wherein said coordinate information associates said map objects and attribute information with corresponding areas of geographic maps from said different mapping systems;
            wherein a geometry of at least one map object includes a polygon that encompasses a plurality of map objects in a corresponding area on said geographic map; and
            wherein said associated attribute information for said polygon includes aggregated information indicating attributes of said corresponding area on said geographic map and based on said attribute information of said plurality of map objects encompassed by said polygon; and
        an information system to access said database system and retrieve said coordinate and attribute information of map objects in accordance with information requests; and at least one client computer system in communication with said server computer system via a network and including:
- a mapping system interface to communicate with said mapping system over said network and facilitate retrieval and manipulation of said geographic map; and
- a user interface configured to:
  - transmit said information requests to said information system in response to user actions;
  - display said geographic map from said mapping system;
  - dynamically render one or more vector-based map layers for said geographic map, wherein said map layers include said map objects and corresponding attribute information and are dynamically rendered based on geometrical formulas and said retrieved coordinate information for said map objects from said information system, and wherein said map layers are compatible with geographic maps from said different mapping systems;
  - overlay said map layers on said geographic map to provide on said displayed geographic map said map objects and corresponding attribute information received from said information system in response to said information requests, wherein each map object of said map layers overlays and corresponds to an area on said geographic map, and wherein at least one overlaid map object and corresponding attribute information include said polygon with said aggregated information for said corresponding area on said geographic map; and
  - enable said user to define a new map object and indicate a corresponding area on said geographic map.

2. The system of claim 1, wherein said database system includes National Census information defining geographic areas for said map objects based on Census data and including attribute information for said defined geographic areas in the form of Census information.

3. The system of claim 2, wherein said database system includes local area information defining geographic boundaries for said map objects within a specific local area and including attribute information for said defined geographic boundaries including information pertaining to said specific local area.

4. The system of claim 1, wherein said server computer system further includes:
a database builder to receive overlay specifications and user preferences and to generate said coordinate and attribute information for said database system and modules to process said information requests for said information system in accordance with said specifications and preferences.

5. The system of claim 1, wherein said user interface produces and transmits said information requests to said information system in response to user manipulation of said geographic map, wherein said produced information requests enable retrieval of said map objects corresponding to geographic areas within said manipulated geographic map.

6. The system of claim 5, wherein said user manipulation of said geographic map includes at least one of re-centering, panning and zooming.

7. The system of claim 1, wherein said user interface produces and transmits said information requests to said information system in response to user selection of a map object on said geographic map, wherein said produced information requests enable retrieval of said attribute information for said selected map object.

8. The system of claim 1, wherein said database system includes attribute information for said geographic areas in the form of business information and statistics for a plurality of predetermined time intervals, and said user interface enables user selection of a geographic area and generation of at least one of reports, charts and graphs with said business information and statistics within a desired time interval for said selected geographic area.

9. The system of claim 1, wherein said database system includes attribute information arranged in accordance with a plurality of predetermined time intervals, and said user interface enables user entry of parameters for retrieval of said arranged attribute information from said database system in accordance with said parameters, and wherein said user interface overlays and arranges said retrieved attribute information on said geographic map based on said predetermined time intervals and enables user selection of a predetermined time interval to display attribute information associated with that selected predetermined time interval.

10. The system of claim 9, wherein display of said retrieved attribute information is color coded based on said predetermined time intervals.

11. A computer-implemented method of integrating information with a geographic map from a mapping system comprising:
(a) storing in a database system coordinate and attribute information associated with map objects for a geographic map provided by a mapping system from among a plurality of different mapping systems;
  wherein said coordinate information associates said map objects and attribute information with corresponding areas of geographic maps from said different mapping systems;
  wherein a geometry of at least one map object includes a polygon that encompasses a plurality of map objects in a corresponding area on said geographic map; and
  wherein said associated attribute information for said polygon includes aggregated information indicating attributes of said corresponding area on said geographic map and based on said attribute information of said plurality of map objects encompassed by said polygon;
(b) communicating with said mapping system over a network from a client computer system and facilitating retrieval and manipulation of said geographic map;
(c) transmitting information requests from said client computer system to a server computer system to access said database system in response to user actions pertaining to said geographic map;
(d) accessing said database system from said server computer system and retrieving said coordinate and attribute information of map objects in accordance with said information requests;
(e) displaying said geographic map from said mapping system on said client computer system;
(f) dynamically rendering one or more vector-based map layers for said geographic map, wherein said map layers include said map objects and corresponding attribute information and are dynamically rendered within said client computer system based on geometrical formulas and said retrieved coordinate information for said map objects from said database system, and wherein said map layers are compatible with geographic maps from said different mapping systems;

(g) overlaying said map layers on said geographic map to provide on said displayed geographic map said map objects and corresponding attribute information received from said database system in response to said information requests, wherein each map object of said map layers overlays and corresponds to an area on said geographic map, and wherein at least one overlaid map object and corresponding attribute information include said polygon with said aggregated information for said corresponding area on said geographic map; and (h) enabling said user to define a new map object and indicate a corresponding area on said geographic map.

12. The method of claim 11, wherein said database system includes National Census information defining geographic areas for said map objects based on Census data and including attribute information for said defined geographic areas in the form of Census information.

13. The method of claim 12, wherein said database system includes local area information defining geographic boundaries for said map objects within a specific local area and including attribute information for said defined geographic boundaries including information pertaining to said specific local area.

14. The method of claim 11, wherein step (a) further includes:
receiving overlay specifications and user preferences and generating said coordinate and attribute information for said database system in accordance with said specifications and preferences.

15. The method of claim 11, wherein step (c) further includes:
producing and transmitting said information requests in response to user manipulation of said geographic map, wherein said produced information requests enable retrieval of said map objects corresponding to geographic areas within said manipulated geographic map.

16. The method of claim 15, wherein said user manipulation of said geographic map includes at least one of re-centering, panning and zooming.

17. The method of claim 11, wherein step (c) further includes:
producing and transmitting said information requests in response to user selection of a map object on said geographic map, wherein said produced information requests enable retrieval of said attribute information for said selected map object.

18. The method of claim 11, wherein said database system includes attribute information for said geographic areas in the form of business information and statistics for a plurality of predetermined time intervals, and step (g) further includes:
enabling user selection of a geographic area and generation of at least one of reports, charts and graphs with said business information and statistics within a desired time interval for said selected geographic area.

19. The method of claim 11, wherein said database system includes attribute information arranged in accordance with a plurality of predetermined time intervals, and step (g) further includes:
enabling user entry of parameters for retrieval of said arranged attribute information from said database system in accordance with said parameters;
overlaying and arranging said retrieved attribute information on said geographic map based on said predetermined time intervals; and
enabling user selection of a predetermined time interval to display attribute information associated with that selected predetermined time interval.

20. The method of claim 19, wherein step (g) further includes:
color coding display of said retrieved attribute information based on said predetermined time intervals.

* * * * *